US012752932B2

(12) United States Patent

Rajole et al.

(10) Patent No.: US 12,752,932 B2
(45) Date of Patent: Oct. 6, 2026

(54) BAGGAGE HANDLING SYSTEM AND METHOD USING ARTIFICIAL INTELLIGENCE

(71) Applicant: Delta Air Lines, Inc., Atlanta, GA (US)

(72) Inventors: Saurabh Rajole, Kennesaw, GA (US); Matthew DeGenova, Newnan, GA (US); Mallikarjuna Y. Bachu, Cumming, GA (US); Thayumanav Jayadevan, Atlanta, GA (US); Nathaniel P. Helms, Atlanta, GA (US)

(73) Assignee: Delta Air Lines, Inc., Atlanta, GA (US)

( * ) Notice: Subject to any disclaimer, the term of this patent is extended or adjusted under 35 U.S.C. 154(b) by 244 days.

(21) Appl. No.: 18/675,331

(22) Filed: May 28, 2024

(65) Prior Publication Data

US 2025/0276809 A1 Sep. 4, 2025

Related U.S. Application Data

(60) Provisional application No. 63/559,566, filed on Feb. 29, 2024.

(51) Int. Cl.

| | |
|---|---|
| ***B64F 1/36*** | (2024.01) |
| ***G06Q 10/0631*** | (2023.01) |
| ***G06Q 10/08*** | (2024.01) |

(52) U.S. Cl.

CPC ...... *B64F 1/368* (2013.01); *G06Q 10/063112* (2013.01); *G06Q 10/06312* (2013.01); *G06Q 10/08* (2013.01)

(58) Field of Classification Search

CPC ........... B64F 1/368; G06Q 10/063112; G06Q 10/06312; G06Q 10/08

See application file for complete search history.

(56) References Cited

U.S. PATENT DOCUMENTS 8,688,496 B1 * 4/2014 Tansupaswatdikul ...................... G06Q 10/08 705/5

2002/0107714 A1 8/2002 Whitlock et al.

(Continued)

OTHER PUBLICATIONS

Nahavandi, S., et al., "Estimating Performance Indexes of a Baggage Handling System using Metamodels," https://www.researchgate.net/publication/224453671, Mar. 2009, 7 pages.

(Continued)

*Primary Examiner* — Ernesto A Suarez
*Assistant Examiner* — Laurence R Brothers
(74) *Attorney, Agent, or Firm* — Edell, Shapiro & Finnan, LLC

(57) ABSTRACT

A system and methods that leverage artificial intelligence (AI) techniques by which one or more machine learning models are trained to improve baggage handling operations. The system and methods are applicable to other uses within airport operations such as aircraft cabin cleaning and aircraft fueling, as well as other operations, such as cargo handling, package delivery, etc. The system optimizes operations by fine tuning and tracking drive time per bag-run by allowing for nearby pickups/drops to minimize time and distance between baggage handler assignments. The system also manages all baggage handlers and tasks, adjusts baggage handler routing as flights depart and arrive an airport and identifies so-called hopeless baggage runs.

20 Claims, 15 Drawing Sheets

(56) References Cited

U.S. PATENT DOCUMENTS

| | | | |
|---|---|---|---|
| 2020/0269994 A1 | 8/2020 | Svenningsen et al. | |
| 2020/0290820 A1 | 9/2020 | Pinel et al. | |
| 2021/0035029 A1 | 2/2021 | Vaculin et al. | |
| 2021/0053699 A1* | 2/2021 | Carpenter ............... | B64F 1/368 |
| 2022/0024603 A1* | 1/2022 | Keene ................... | B62B 5/0079 |

OTHER PUBLICATIONS

Beumergroup, "Overcoming Baggage Handling Issues Caused by Plastic-Wrapped Bags in Airports," Knowledge Hub, retrieved from: https://www.beumergroup.com/knowledge/airport/overcoming-baggage-handling-issues-caused-by-plastic-wrapped-bags-in-airports/, Jul. 7, 2023, 7 pages.

Github, "Route13 Architecture," MikeHopcroft/route13, Documentation, Architecture.md, retrieved from: https://github.com/MikeHopcroft/route13, Feb. 1, 2024, 13 pages.

* cited by examiner

1300

BAGGAGE HANDLING SYSTEM AND METHOD USING ARTIFICIAL INTELLIGENCE

CROSS REFERENCE TO RELATED APPLICATION

This application claims priority to U.S. Provisional Application No. 63/559,566, filed Feb. 29, 2024, the entirety of which is incorporated herein by reference.

TECHNICAL FIELD

The present disclosure relates to baggage handling systems and methods for airport and airline operations.

BACKGROUND

Timely and efficient handling of passenger baggage for airport/airline operations is a major undertaking. Delivering baggage from one aircraft to another aircraft for passengers transferring aircraft to reach their final destination can be challenging in a busy airport, particularly when flight schedules become altered due to weather, etc.

DETAILED DESCRIPTION

Overview

Presented herein are a system and methods that leverage artificial intelligence (AI) techniques by which one or more machine learning models are trained to improve baggage handling operations. The system and methods are applicable to other uses within airport operations, such as aircraft cabin cleaning and aircraft fueling, as well as other operations, such as cargo handling, package delivery, etc. The system optimizes operations by fine tuning and tracking drive time per bag-run by allowing for nearby pickups/drops to minimize time and distance between baggage handler assignments. The system also manages all baggage handlers and tasks, adjusts baggage handler routing as flights depart and arrive at an airport, and identifies so-called hopeless baggage runs.

The system employs a simulator built based on airport operational data and processes for baggage transfer operations, to train one or more machine learning models. The techniques accommodate airport infrastructure, technology and airline/airport process operations.

Example Embodiments

The system and methods presented herein leverage machine learning, such as an event-based simulator and machine-learning (ML) models, to improve baggage handling system operations. The ML models use real-time airline operation data for effective decision making for baggage handling.

Figure 1:
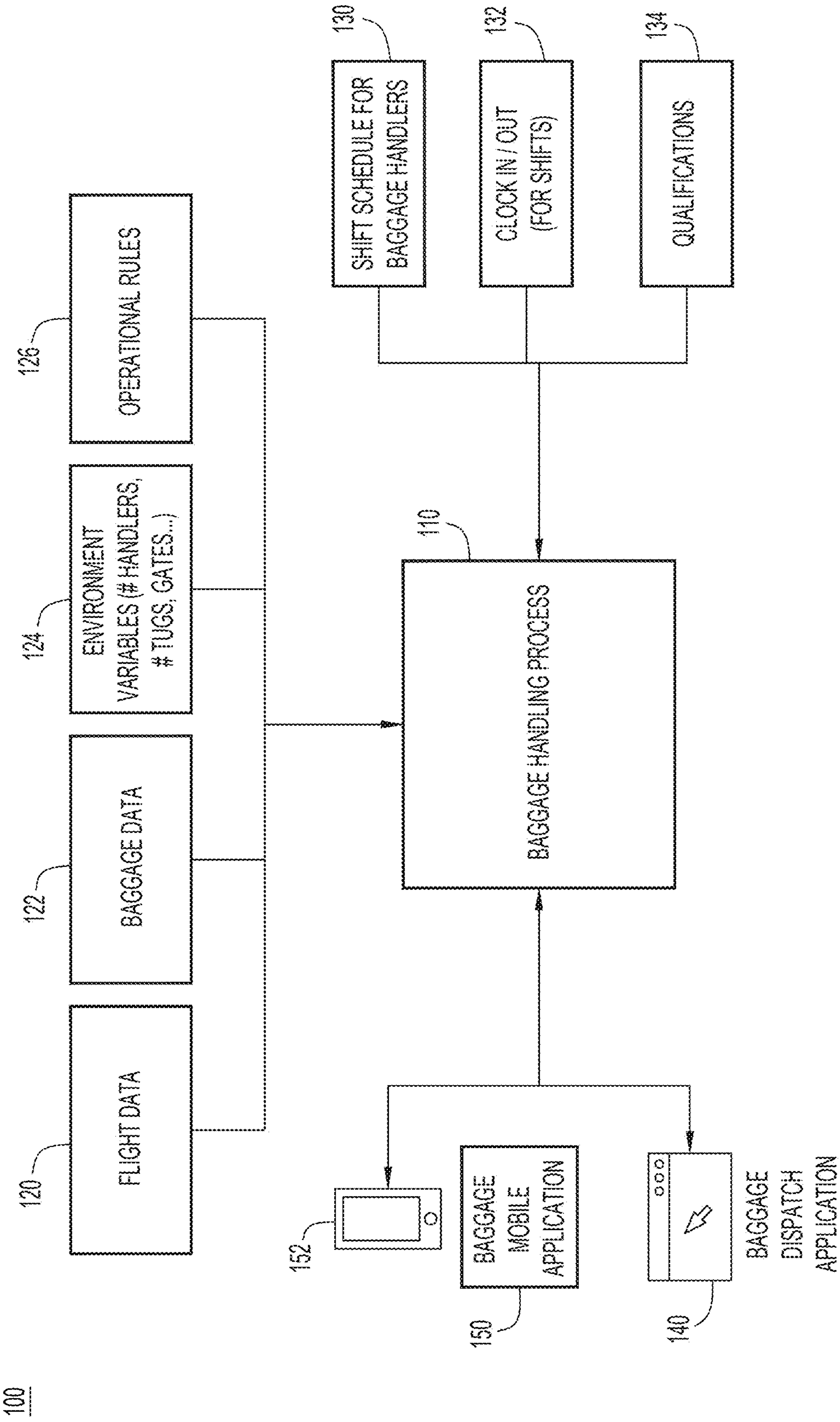
FIG. 1 illustrates a block diagram of a system for managing the handling of airline baggage, according to an example embodiment.

Reference is first made to FIG. 1. FIG. 1 illustrates a block diagram of a system 100 for managing the handling of airline baggage, according to an example embodiment. The system 100 includes, at its core, an AI-based baggage handling process 110. The baggage handling process 110 receives a variety of inputs, including flight data 120, baggage data 122, environment variables 124 and operation rules 126. The flight data 120 consists of the schedule of all inbound and outbound flights for a given day at an airport, including actual arrival times and departure times, types of aircraft for each of the flights (which indicates the quantity of baggage on a given flight), etc. The baggage data 122 includes data about each bag checked in for each flight and the ultimate final destination for the bag, including information about any connecting flight(s). The environment variables 124 indicate the number of baggage handlers (also called baggage tug drivers), the number of baggage tug vehicles, the number of gates at the airport, etc. The operation rules 126 include data describing operational ground truths about various aspects of operations at a given airport (based on physical limitations, etc.) or aspects of baggage operations in general. Examples of operation rules include a travel time between concourses that cannot be violated when making decisions about moving baggage between concourses for a connecting flight, time needed to retrieve a given baggage item out of a baggage storage room (e.g., 45 minutes), maximum number of stops permitted for a tug on a given task, etc.

In addition, the baggage handling process 110 receives as input shift schedule data 130 for the baggage handlers, clock in/out data 132 for the shifts of baggage handlers and qualifications 134. The qualifications 134 refer to data describing tug driver qualifications. Rules governing airport operations require that tug drivers obtain certifications that allow them to drive into certain areas of the airport including completion of a safe driver course, approval to enter into an international flight area, approval to enter into a pre-cleared international flight area, etc. Thus, not all tug drivers will necessarily have the qualifications to engage in all baggage related tasks. For example, there may be a task that involves entering certain restricted areas, like international flight areas or driving into certain areas where the driver safety course needs to be completed. This is useful information to have so that tug drivers with the appropriate qualifications are used for selection to perform a given task.

The baggage handling process 110 generates outputs that are sent to a baggage dispatch application 140 and to a baggage mobile application 150 running on a mobile device 152 (e.g., Smartphone or tablet device) that is carried and used by each baggage handler. The baggage dispatch application 140 manages the baggage handlers who drive the baggage tug vehicles to the gates to load bags onto the aircraft and/or unload bags from the aircraft, and to transport the bags to one or more other gates to be loaded onto outbound aircraft (for "connecting bags"), to a temporary holding location (referred to as a "baggage storage room"), or to a passenger baggage pickup area of the airport for passengers whose final destination is that airport (for "local bags"). The baggage mobile application 150 notifies the baggage handlers of the next task or gate to load bags to, or unload bags from, aircraft at that gate. For example, the baggage mobile application 150 is configured to, based on controls sent by the baggage handling process 110, to transmit messages to hand-held devices carried by baggage tug drivers and/or to tug-vehicle mounted devices, the messages notifying respective baggage tug drivers of task assignments.

Figure 2:
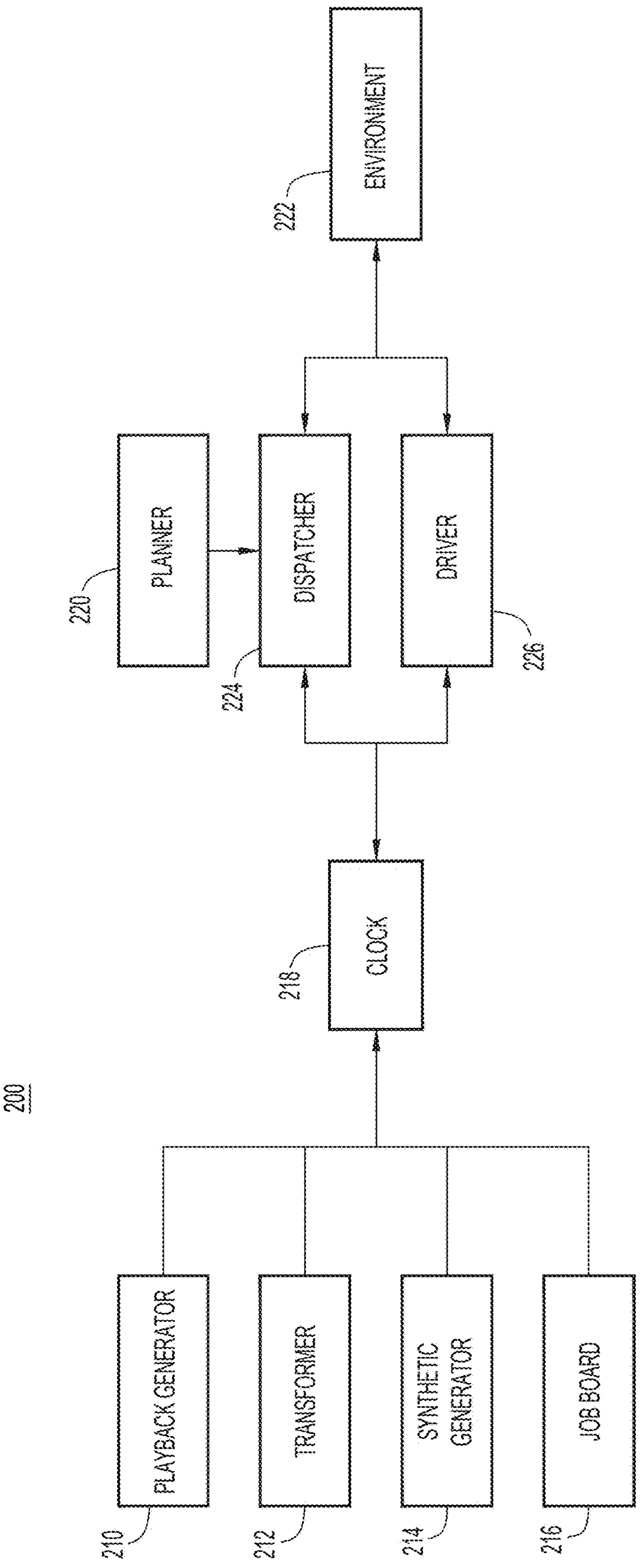
FIG. 2 is a block diagram of a simulator that may be used to set decision parameters and to tune machine learning models used in a baggage handling process, according to an example embodiment.

Turning now to FIG. 2, a block diagram is shown of a simulator 200 that may be used to set decision parameters and to tune machine learning models used in the baggage handling process 110 referred to above. The simulator 200 includes a playback generator 210, transformer 212, synthetic generator 214, job board 216, clock 218, planner 220, environment 222, dispatcher 224 and driver 226. The simulator 200 represents a "digital twin" that mimics or represents the physical and operational environment of a given airport where baggage handling is a part of the airport operations. The simulator 200 learns how to adjust certain aspects of baggage operations based on changes to the simulated airport environment. Deep Reinforcement Learning techniques may be used in the simulator 200 whereby the simulator is rewarded for a positive outcome for a baggage handling task (like winning a game per the Deep Reinforcement Learning paradigm) among thousands and thousands of baggage handling tasks that are represented by the simulator 200. There are various determination and decision steps that are performed as part of the baggage handling process depicted in FIG. 1 (and described further below), and these determination and decision steps are adjusted/tuned based on what is learned from operation of the simulator 200.

The playback generator 210 produces streams of events that serve as input to the simulation performed by the simulator 200. The events are recorded events from real-world operations at a given airport for a period of time, and include information for all of the various inputs to the baggage handling process 110 shown in FIG. 1, such as flight data 120, baggage data 122, environment variables 124, operation rules 126, shift schedule 130 for baggage handlers, clock in/clock out data 132 and qualifications 134.

Sometimes it is useful to ask "what if" questions, based on a recorded event stream. Suppose, for example, that an airline has recordings of flight arrival and departure times at a particular airport, along with gate assignments and baggage routing information for connecting flights. When evaluating parameters of a baggage handling process, it may be useful to see how it would perform on the same day, if weather were to delay afternoon flight arrivals, for example. Bags on planes arriving late may have tighter connection times.

The transformer 212 layers changes (e.g., weather delays, air traffic delays, etc.) on top of the events provided by the playback generator 210. This approach typically makes use of a simple simulator to determine a sequence of events after adding random delays.

Sometimes logs of real-world events are not available. The synthetic generator 214 uses probability distributions to create a sequence of event changes that conform to a set of business rules. The synthetic generator 214 may incorporate a simulator to assign data to events useful for the main simulation. The complexity of this simulator depends on the constraints of the physical environment.

The job board 216 is a list of jobs or tasks to be used in the simulation, such as to transport connecting bags between aircraft gates, transporting bags to a baggage room, etc.

The simulation run by the simulator 200 may be an event-driven simulation. The clock 218 maintains a priority queue of events ordered by start time. The main loop of the simulation pulls events out of the queue and runs them. This continues as long as there are events in the queue. When the queue becomes empty, the simulation ends. The act of processing an event may result in a new event.

The planner 220 coordinates event chains to form loops. Event loops can relate to a system shutdown variable, to break out of the loop, in the case of a time-bounded simulation.

The environment 222 maintains the current known state of the world and provides methods, called estimators, for predicting the outcomes of various physical processes. The dispatcher 224 and the driver 226 perform actions in the environment 222. The planner 220 strives to find an optimal ordering of activities for the dispatcher 224 and driver 226.

The simulator 200 allows for testing the impact of certain changes (shortened bag cut-off time, fewer drivers, etc.) by running those changes on the simulator to determine viable strategies to respond to those scenarios when and if they should arise in real-time operation of the baggage handling system at an airport. The simulator 200 can inform which aspects should be re-prioritized in order to maintain suitable operations.

Figure 3:
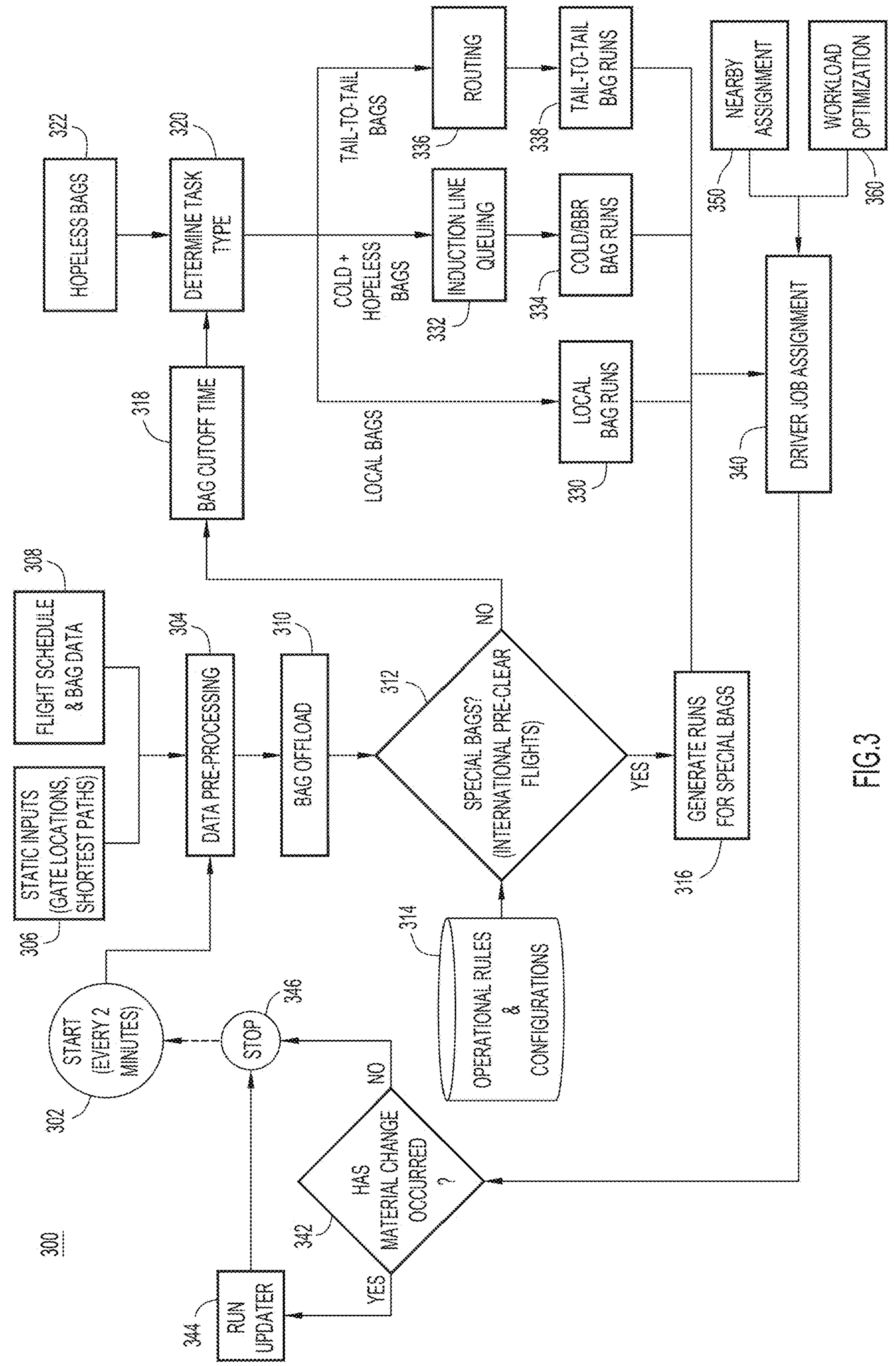
FIG. 3 is a flow chart that depicts an operational flow of a baggage handling process, according to an example embodiment.

Referring to FIG. 3, a flow chart is provided that depicts the operational flow 300 of the baggage handling process 110 depicted in FIG. 1. Reference is also made to FIG. 1 for purposes of the description of FIG. 3. The operational flow 300 starts/repeats at a predetermined period (e.g., every 2 minutes) at step 302 to address all bags in the system (at a given airport) for a sliding window of a predetermined time interval (e.g., two hours). Thus, adjustments can be made periodically (e.g., every 2 minutes) to optimize baggage handling if changes occur due to aircraft arrivals and departures, for example, fewer tug drivers, weather delays that may slow travel on the airport tarmac, etc., for the next predetermined time interval. However, the operational flow 300 may be configured so as not to make a change to a driver task if the driver has already started that task during that predetermined time window, or if a driver task is within a predetermined time of picking up one or more bags for a task, because the disruption caused to a driver task at that point in time may not be worth the minor additional optimization for that task. That is, some changes to one or more tasks that are generated every two minutes may be blocked if those changes are too close in time to a tug driver's performance of the task. Certain material changes, such as a gate change for a connecting flight, will not be blocked because that is a meaningful change that needs to be addressed to avoid mishandling of a bag.

Data pre-processing is performed at step 304 on the static inputs 306 (gate locations, shortest paths between gate locations, etc.) and flight schedule data and baggage data at 308. Next, a bag offload process is executed at 310. The bag offload process, described below in connection with FIG. 4, involves determining estimated bag offload times for bags on inbound aircraft.

After the bag offload process, a determination is made as to whether there are any "special bags" among the bags that are part of the estimated bag offload times. Input to the special bags determination step 312 are one or more operation rules and configurations, shown at 314, that may be used to determine if a bag qualifies as "special". For example, there may be bags associated with international flights that have been previously cleared, and these bags are to be given special handling. If there are special bags on a given flight, then at 316, the system generates one or more runs for those special bags. Processing thereafter continues as described further below.

If there are no special bags on a given flight for which estimated bag offload times have been generated, then at 318, a bag cutoff time is computed. The bag cutoff time is a time that is computed, depending on the ultimate destination of the bag, to determine whether the bag can be put in a baggage storage room or transported directly from one gate to another gate to be loaded onto another aircraft (so-called tail-to-tail bag transfer). The bag cutoff time computation is described further below in connection with FIG. 5.

After 318, the operational flow 300 proceeds to 320 where a determination is made as to the type of task to be performed for bags that have been processed to this point. In addition, there is a hopeless bags process 322, the output of which is also provided as input to 320.

The term "hopeless bags" refers to bags that have no impact on mishandled bag report (MBR) count. So-called "hopeless bags" can be said to have a non-urgent status. In other words, a determination is made of baggage transfer based on connection time and connection gate of an associated passenger to focus on deliverable bags and ignoring bags which have no MBR impact. The hopeless bags process 322 is described below in connection with FIG. 6. The task type determination of step 320 involves determining whether a given bag is a local bag (this airport is its final destination), a tail-to-tail (connecting) bag that needs to be taken directly to an aircraft at another gate, or a cold/hopeless (connecting) bag that can be taken to a baggage storage room pending time to be delivered to a gate to be loaded onto an aircraft.

If at 320 a bag is determined to be a local bag, then it is assigned to be handled by local bag runs at 330.

If a bag is determined to be a cold or hopeless bag, then it is handled by induction line queuing to a baggage room at 332. The induction line queueing is described in more detail below in connection with FIGS. 7A and 7B. After a bag completes induction line queueing, it is eventually delivered to a baggage room via a cold/bag room bag runs at 334.

If a bag is determined to be a tail-to-tail (connecting) bag, then it is processed by the routing at 336. The operations of the routing (also called route optimization) are described below in connection with FIG. 8. After processing by the routing 336, the bag is assigned to be handled as part of tail-to-tail bag runs at 338.

After operations at 330, 334 and 338, the process continues to 340 for driver job assignment. The inputs to the driver job assignment 340 are outputs of nearby assignment process 350 and workload optimization process 360. The operations of the nearby assignment process 350 are described below in connection with FIGS. 9A and 9B. The operations of the workload optimization process 360 are described below in connection with FIG. 10. The driver job assignment 340 involves assigning the job for a bag from 330 (a local bag), or 334 (cold or hopeless bag) or 338 (tail-to-tail bag) based on input from nearby assignment process 350 and workload optimization process 360. The operational flow 300 stops after driver job assignment 340, until it starts again at 302.

After driver assignment 340, a determination is made at 342 as to whether there are any material changes that have occurred (e.g., gate changes or material estimated time of arrival or estimated time of departure changes). If a material change has occurred, then a run updater operation 344 is performed as a final check before the aircraft arrives to ensure the best possible bag determinations. If no material change has occurred, then the process is complete as shown at 346 until the next iteration/execution at step 302 as shown in FIG. 3.

Figure 4:
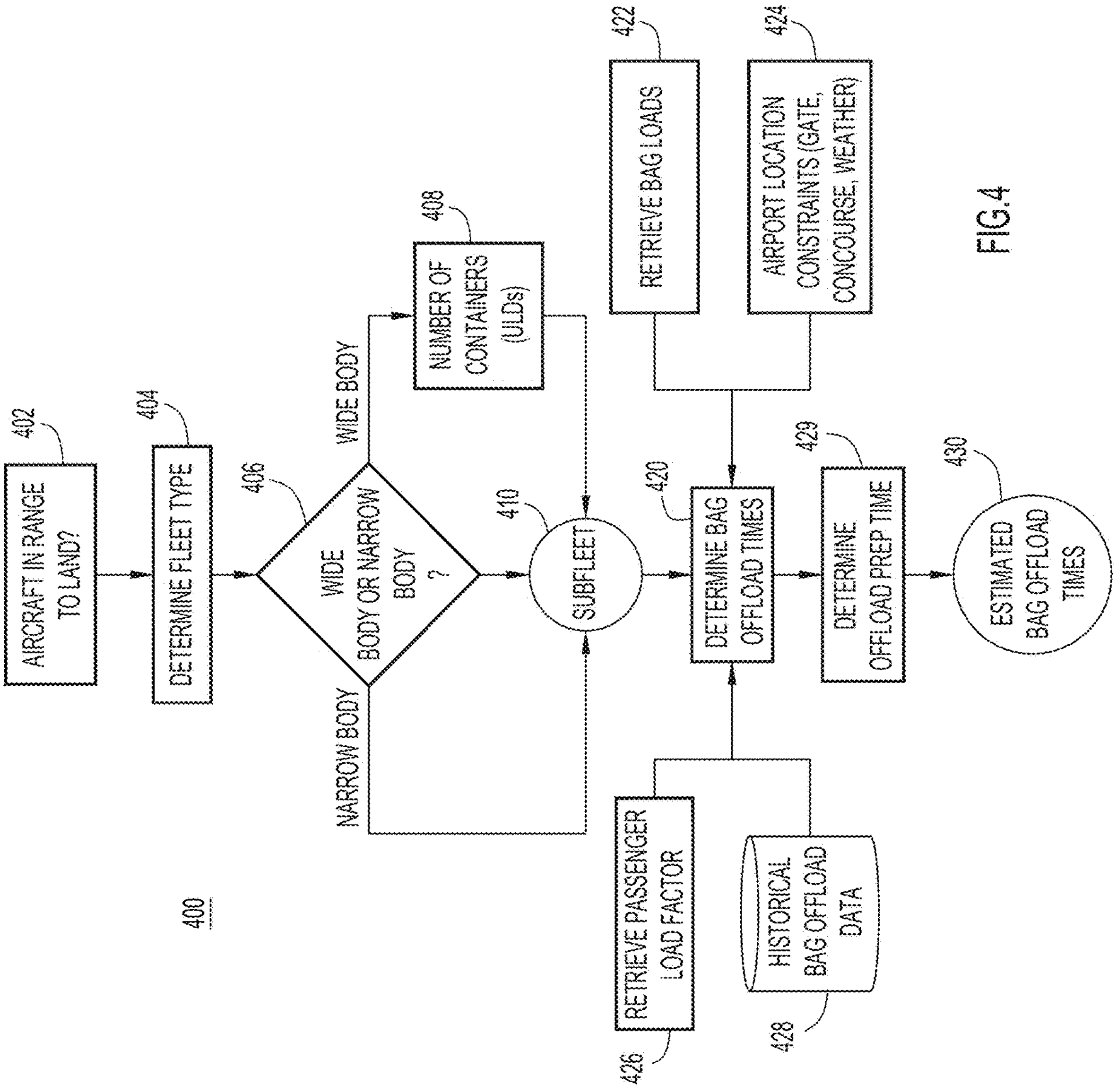
FIG. 4 illustrates a flow chart depicting a bag offload process, according to an example embodiment.

Reference is now made to FIG. 4 for a description of a bags offload process 400, such as the bag offload process referred to above at 310 in connection with FIG. 3. Again, the bags offload process 400 determines estimated bag offload times for inbound aircraft carrying bags to be handled. This involves modeling of the offload time of arrival flights based on fleet type/sub-type of the aircraft and bag volume (how many bags are on the aircraft). Different size/types of aircraft have different luggage capacity and, moreover, a given flight may carry a different volume of luggage regardless of the capacity of the aircraft.

At 402, a determination is made that an aircraft is in range to land at the airport. Next, at step 404, the fleet type of the aircraft is determined. The fleet type may be based on aircraft manufacturer and model (e.g., Boeing 737, for example). Next, at step 406, a determination is made as to whether the aircraft is a narrow body or wide body aircraft. If the aircraft is a widebody aircraft, then at step 408, a determination is made as to the number of containers (as widebody aircraft carry luggage in containers in the belly of the aircraft). These containers are also called unit load devices (ULDs) and are useful to store cargo as they can be grouped and used to restrain cargo, mail and baggage for air transport. After step 408, or if the aircraft is determined to be a narrow body aircraft, then at step 410 the subfleet of the aircraft is determined. The subfleet may be a particular sub-type of an aircraft model (e.g., Boeing 737-900). Each subfleet may have unique cargo configurations, and thus be useful to know in estimating baggage offload times.

At step 420, a determination/computation is made of bag offload times. Inputs to step 420 include the subfleet type determined at step 410. In addition, also provided as input to step 420 are the bag load of the aircraft (how many bags were loaded onto the aircraft at its departure point) 422, airport location constraints 424 (such as gate arrangement, concourse arrangement, current weather), passenger load of the aircraft (how many passengers are actually on the aircraft for the flight relative to its capacity) 426 and historical bag offload data 428 that indicates typically how long it takes to offload bags from that particular type of aircraft. At step 429, there is an estimation made as to the time between the arrival of the aircraft at the gate and the actual start of the offload of bags/cargo from the aircraft. Thus, the bag offload times are estimated based on all the inputs shown in FIG. 4, to produce as output estimated bag offload times in step 430 for the bags on that aircraft, including the offload prep time from step 429, such that the total bag offload time in step 430 is based on the bag offload time from step 420 plus the offload prep time from step 429. The process 400 may be tuned/adjusted, e.g., in step 420, using what is learned by running the simulator 200 in FIG. 2. That is, the process 400 may be a ML-based process in order to estimate how long it will take for a given bag of a plurality of bags to be offloaded from an aircraft. This is provided as input to a hopeless bags determination process described below in connection with FIG. 6.

Figure 5:
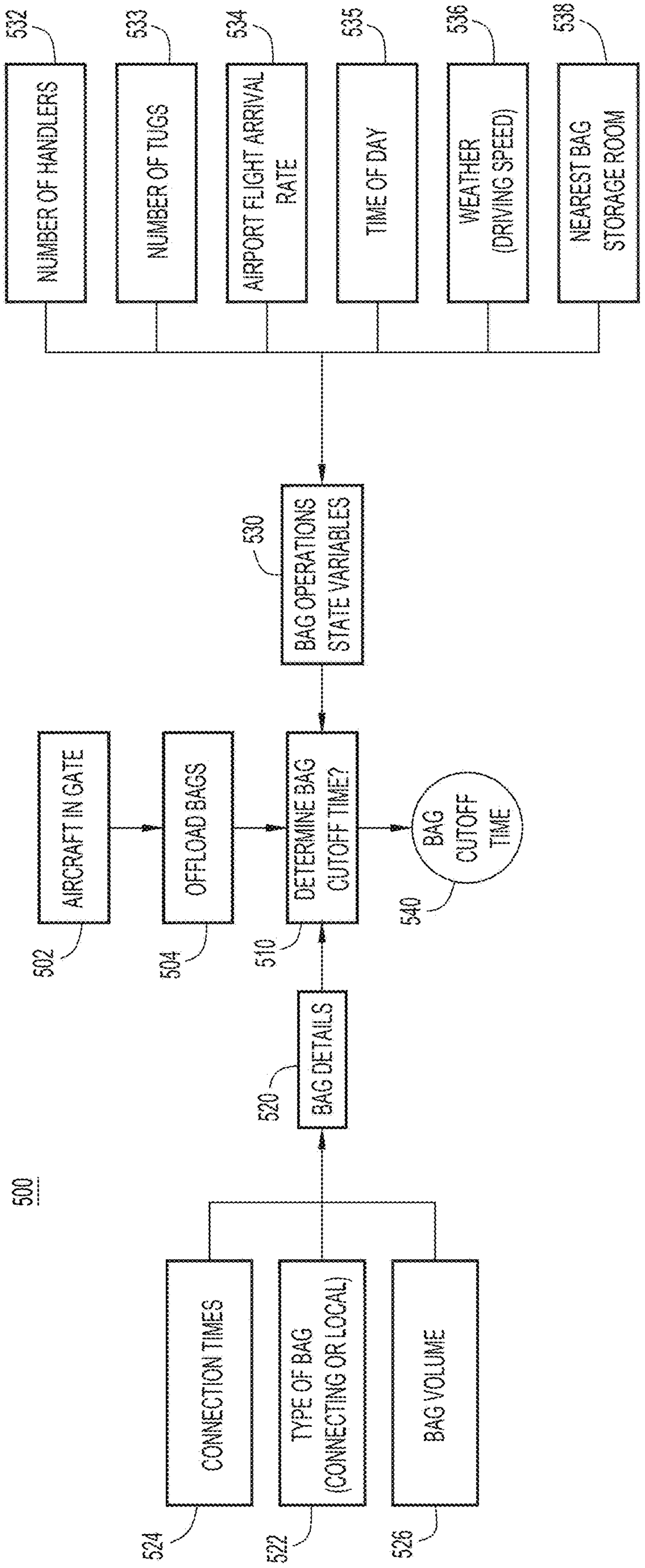
FIG. 5 illustrates a flow chart depicting a bag cutoff time process, according to an example embodiment.

Next, referring to FIG. 5, a flow chart is shown for a process 500 to estimate a bag cutoff time, such as that referred to at 318 in FIG. 3. The bag cutoff time estimation process 500 estimates a time to determine whether a bag should be put in a baggage storage room or handled directly from one aircraft to another aircraft (tail-to-tail handling). The bag cutoff times are made at the flight level for each arrival flight, as opposed to previous systems which would dictate this as a blanket rule for all arrival flights at a given airport, to be changed only a few times each year. The process 500 is executed using an estimated time of arrival of the flight at 502 and the estimated bag offload time at 504 (which is estimated according to the process of FIG. 4) to determine the bag cutoff time. A bag cutoff time is computed/estimated at 510 based on bags details 520 and bag operations state variables 530. The bags details 520 consist of data related to the type of bag (whether it is local or connecting) 522, connection times 524 and bag volume 526. The connection times 524 refer to the departure time of the connecting flight for each connecting bag to be offloaded from the aircraft. The bag volume 526 refers to the number of bags going to each connection flight location from that flight/aircraft.

The bag operations state variables 530 are variables relating to baggage operations at the airport at that time, and include the number of handlers 532, number of tugs 533, airport flight arrival rate 534 (how many aircraft are landing per period of time, e.g., one every 5 minutes), current time of day 535 (daytime or nighttime), weather 536 (which impacts driving speed of the tugs) and distance to nearest baggage storage room 538. Based on the bags details 520, the bag operations state variables 530, the bag cutoff time is estimated at step 510 for each connecting bag on the aircraft. The bag cutoff time 540 is the time by which the bag needs to be put into the bag storage room to allow for sufficient time to be sorted, then retrieve the bag and transport it to the gate for its connecting flight. If that bag cutoff time cannot be met, then instead of directing it to the bag storage room it is handled via a tail-to-tail bag transfer.

Figure 6:
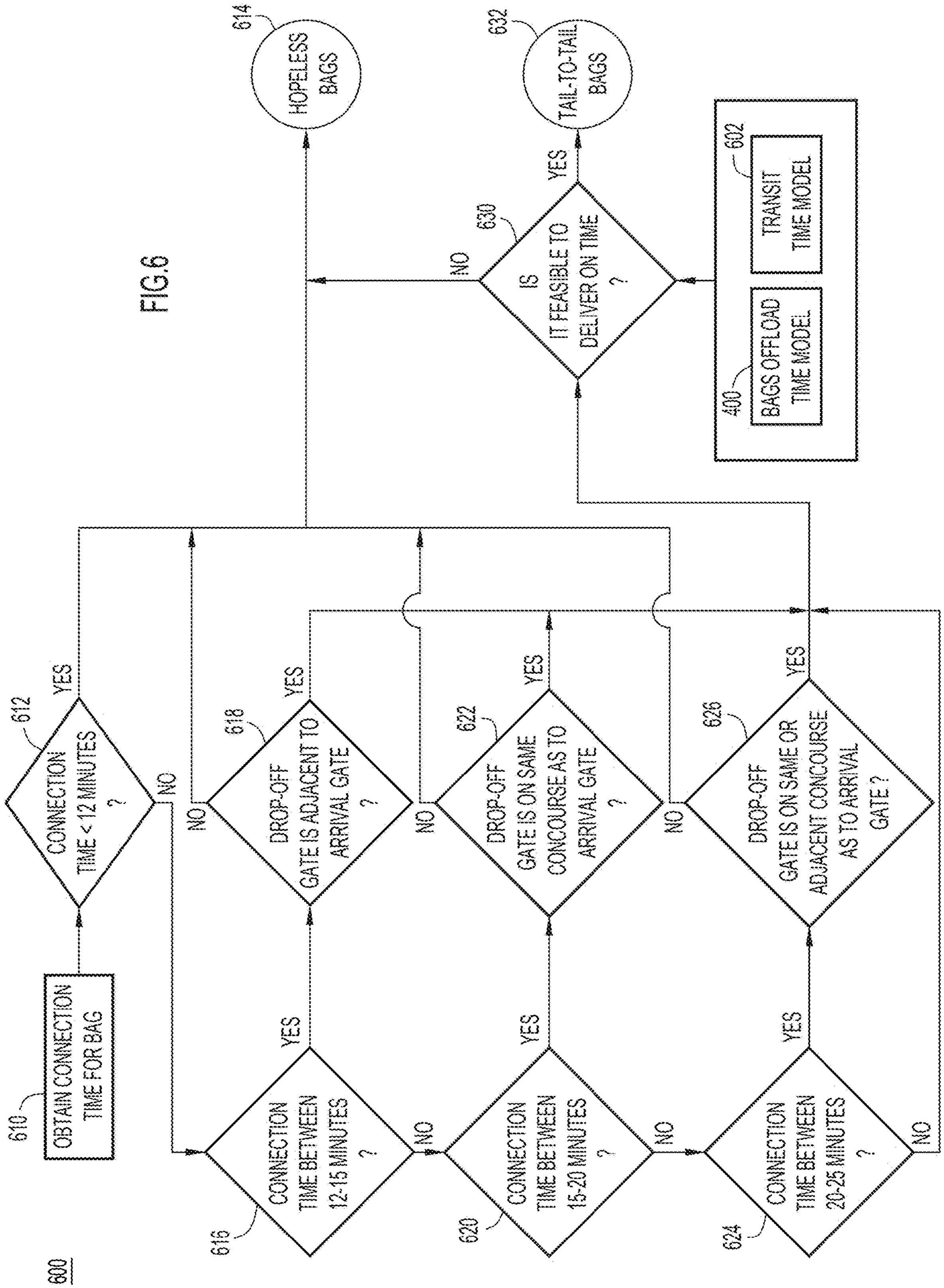
FIG. 6 illustrates a flow chart depicting a hopeless bags determination process, according to an example embodiment.

Reference is now made to FIG. 6 for a description of a hopeless bags determination process 600. This process corresponds to the hopeless bags process 322 of FIG. 3. The underlying premise of this process 600 is to avoid running a connecting bag to a connecting flight if it is unlikely that the passenger for that connecting bag is not likely going to make that connecting flight due to insufficient time, delays, etc. One of the inputs to a decision in the process 600 is the output of the ML-based bags offload time model, which is the output of the process 400 of FIG. 4. Output from a ML-based transit time model 602 may also be provided as an input to the same decision step as the output of the ML-based bags offload time model. The ML-based transit time model 602 is a model that outputs the time it will take for vehicles to travel within the aircraft infrastructure (tarmac, etc.) to transport a bag from one location to another location (e.g., one gate to another gate), and that travel time may depend on weather, available tug drivers, etc. Thus, a time value (e.g., T1) is output from the bags offload time process 400 and a time value (e.g., T2) is also output from the transit time model 602. In some implementations, it may be acceptable to use a deterministic time value instead of output from a ML-based model for the transit time T2.

The hopeless bags determination process 600 includes, at 610, obtaining the connection time for a given bag. The connection time is the departure time of a connecting flight scheduled to depart from the airport for the passenger associated with that bag. Next, at 612, a determination is made whether the connection time is less than a first predetermined time period in the future (e.g., 12 minutes). If the connection time for the bag is less than the first predetermined time period, then it is assumed that the bag cannot be delivered to the departing aircraft in time so the bag is deemed a hopeless bag at 614, and the bag will be handled accordingly (on a non-urgent basis) so that it reaches its final destination. On the other hand, if the connection time for the bag is determined to be more than the first predetermined period time, then at 616, a determination is made whether the connection time for the bag is between the first predetermined time period and a second predetermined time period (e.g., 15 minutes).

If the connection time is determined to be between the first and second predetermined time periods at 616, then at 618, a determination is made whether the drop-off gate for the bag is adjacent to the arrival gate for the bag. If the determination is that the drop-off gate is not adjacent to the arrival gate for the bag, then the bag is deemed a hopeless bag at 614 and is handled accordingly. If the determination is made at 618 that the drop-off gate is adjacent to the arrival gate for the bag, then the process continues to a further determination, at 630, whether it is feasible to deliver the bag on time, as described below.

If, at 616, the determination is made that the connection time for the bag is not between the first and second predetermined time periods (e.g., 12-15 minutes), then at 620, a determination is made whether the connection time is between the second predetermined time period and a third predetermined time period (e.g., 20 minutes). If the determination at 620 is affirmative, then at 622, a determination is made whether the drop-off gate is on the same airport concourse (same array or line of gates) as the arrival gate. If the determination is affirmative at 622, then the process continues to a further determination, at 630, whether it is feasible to deliver the bag on time, as described below, and otherwise, the bag is deemed a hopeless bag at 614.

If the determination at 620 is negative, then at 624, a determination is made whether the connection time for the bag is between the third predetermined time period and a fourth predetermined time period (e.g., 25 minutes). If the determination is affirmative at 624, then at 626, a determination is made whether the drop-off gate for the bag is on the same concourse or adjacent concourse as that of the arrival gate. If the determination at 626 is affirmative, then the process continues to a further determination, at 630, whether it is feasible to deliver the bag on time, as described below, and otherwise, the bag is deemed a hopeless bag at 614.

As shown in FIG. 6, 630 is reached if an affirmative determination is made in any of 618, 622 and 626, or if a negative determination is made at 624. The operation at 630 involves determining whether it is feasible to deliver the bag to its departure (drop-off) gate on time to be loaded onto the departing aircraft based on three items of information: (1) T1 output from the bags offload time process 400; (2) T2 output by the transit time model 602, and (3) T3 representing the connection time of the bag (which determines which logical route taken through the flow chart in FIG. 6 is taken to reach 630). The determination at 630 regarding the feasibility to deliver the bag on time to its destination is therefore dependent on times T1, T2 and T3, to make the decision whether the connecting bag is handled for tail-to-tail delivery to the departing gate of the connecting flight at 632 or the bag is deemed a hopeless bag (614).

Figure 7A:
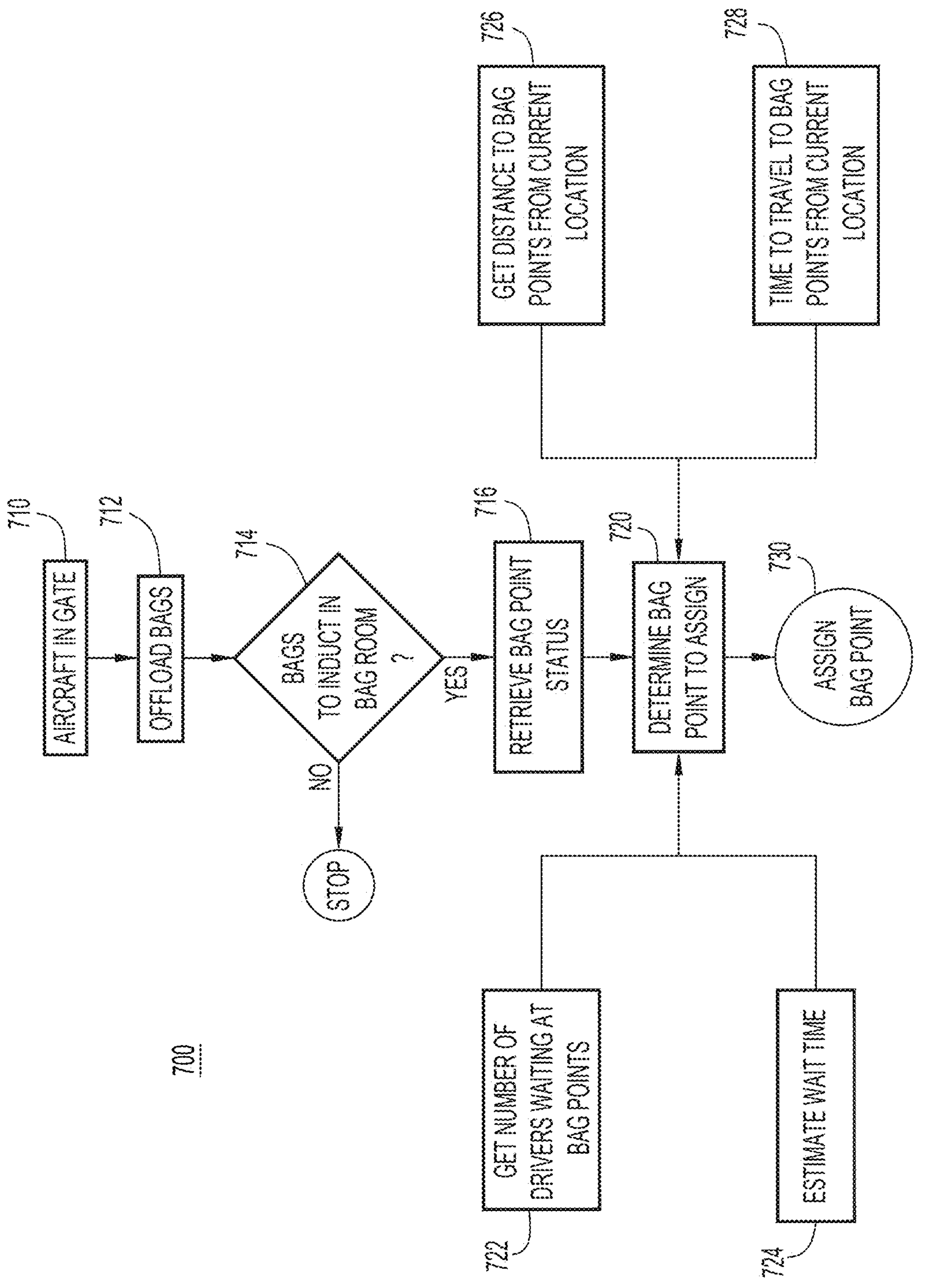
FIG. 7A illustrates an induction line queueing process that is performed for inducting bags into a baggage storage room, according to an example embodiment.
Figure 7B:
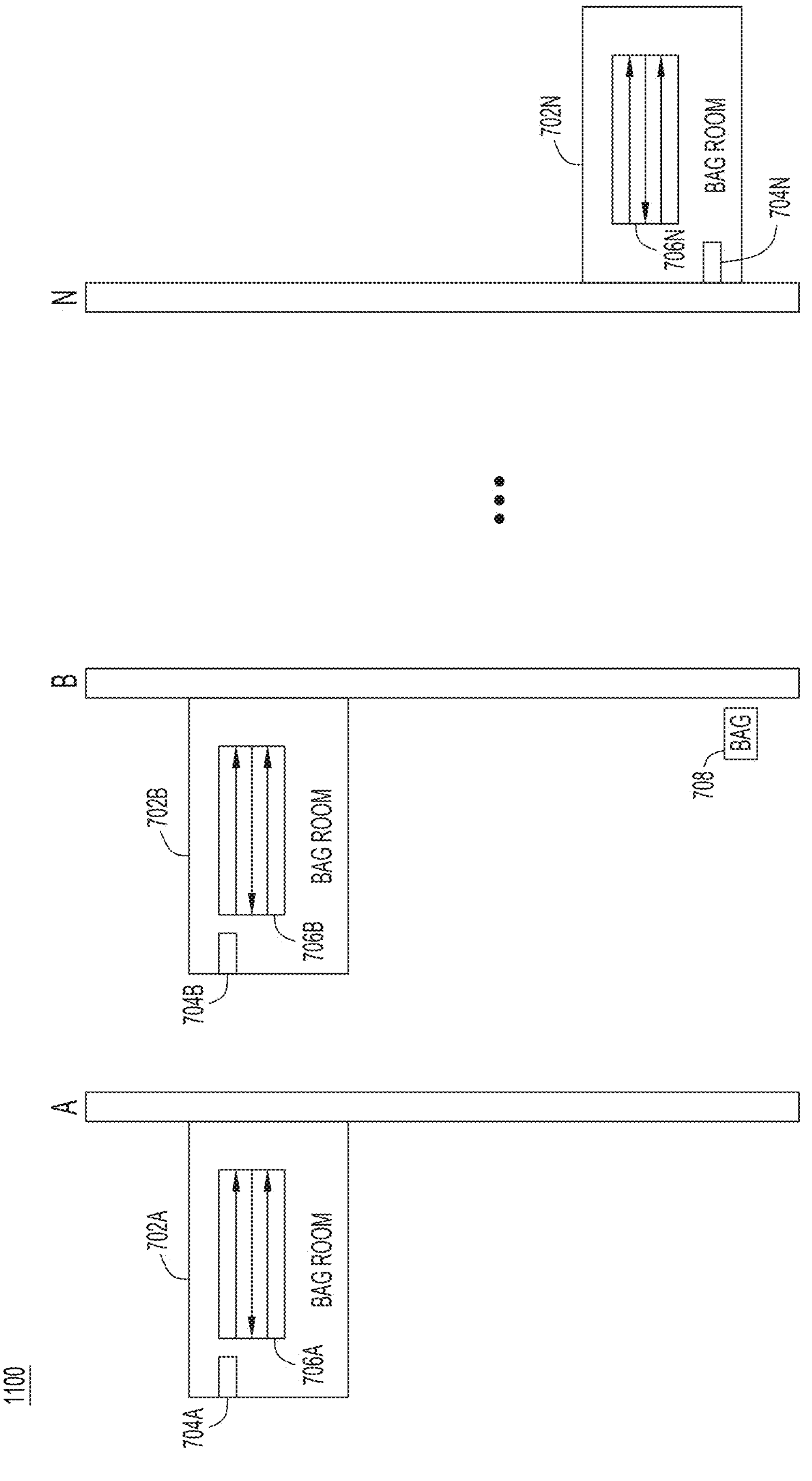
FIG. 7B illustrates an arrangement of baggage rooms across different concourses of an airport, for which the induction line queuing process shown in FIG. 7A may be employed, according to an example embodiment.

Reference is now made to FIGS. 7A and 7B. FIG. 7A illustrates an induction line queueing process 700 that is performed for inducting bags into a baggage room. The induction line queueing process 700 corresponds to the process performed at 332 in FIG. 3. FIG. 7B illustrates a simplified example arrangement of baggage rooms across different concourses A, B, . . . , N of an airport. For example, there is a bag room 702A for concourse A, a bag room 702B for concourse B and a bag room 702N for concourse N. Each bag room has an induction point (also called a bag point) and a baggage conveyor system through which a bag travels as temporary holding until it is time to retrieve the bag and take it to a connecting flight. For example, bag room 702A includes an induction point 704A and a conveyor system 706A, bag room 702B includes an induction point 704B and a conveyor system 706B and bag room 702N includes an induction point 704N and a conveyor system 706N. The induction point of a given bag room may be occupied, at any given point in time, when one or more tug drivers are dropping off or picking up bags from the bag room. Thus, the term bag point status is used herein to refer to the number of baggage tugs, if any, already in queue to drop off bags to, or pick up bags from, a given bag room. There may be an estimated wait time associated with a given bag room that corresponds to how long it will take to drop off a bag at that bag room based on the bag point status of that bag room. In addition, FIG. 7B shows a location of a bag 708 at a gate for concourse B. If the bag 708 is to be inducted into a bag room (for temporary storage until it is delivered at a later time to a gate for a connecting flight), it is desirable to determine which bag room (among the bag rooms 702A, 702B and 702N) to induct that bag, depending on the distance between the current location of the bag 708 and the current wait time for each of the bag rooms. The process 700 addresses this situation.

Referring now to FIG. 7A, At step 710, an aircraft arrives at a gate and bags are offloaded at 712. At 714, a determination is made whether there are bags offloaded from the aircraft that are to be inducted into the bag room. If it is determined that there are no bags to be inducted into the bag room, then the process 700 stops. Otherwise, the process continues to 716.

At 716, the bag point status for each of the bag rooms is obtained. The system knows the bag point status because it has awareness of previously assigned tasks to the respective bag rooms. Next, at 720, a determination is made of the bag point (e.g., which bag room) to assign to the bag. The selection of the bag point to assign to the bag is based on several items of information, including the bag point status at 716, as well as the number of tug drivers waiting at the respective bag points at 722 (thus indicating how busy the induction points are to the bag rooms), an estimated wait time at 724 at each of the bag rooms (how long will it take to induct a bag to the bag room based on how busy the induction point is at the bag rooms), a distance to the bag rooms from the current location of the bag at 726, and the time it would take to travel to the bag rooms from the current location of the bag, at 728. Again, knowledge of the bag point status and estimated wait times may be determined because the system knows, at any given time, how many baggage tug drivers (and number of bags) were recently assigned and instructed to go to the various baggage storage rooms in the system. It may be, that at a given point in time, bag 708 shown in FIG. 7B should be assigned to bag room 702N because it will take the least amount of time to get the bag into the bag room (taking into account the short wait time and travel time) despite the fact that bag room 702N may be quite far in distance from the current location of bag 708. Thus, the determination made at 720 takes into account these items of information to determine an appropriate bag room to assign to the bag for induction into the bag room, and this assignment is output at 730.

Figure 8:
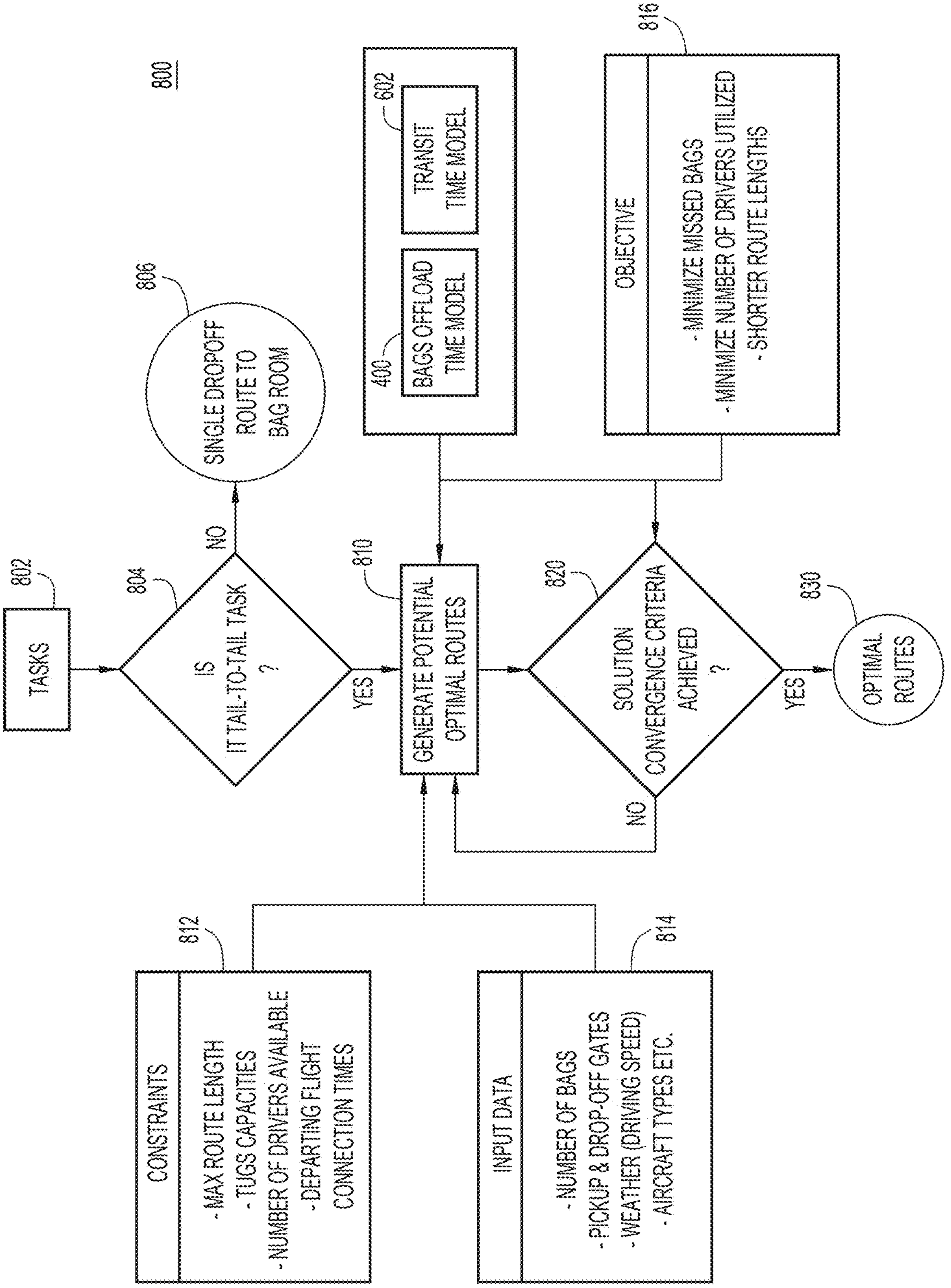
FIG. 8 illustrates a flow chart of a route optimization process, according to an example embodiment.

Reference is now made to FIG. 8, which shows a flow chart of a route optimization process 800. The route optimization process 800 may be invoked at 336 in FIG. 3. At 802, a task is obtained from a given bag (as output from 320 in FIG. 3). At 804, it is determined whether the task is a tail-to-tail task, and if it is not, then at 806, the bag is assigned a single drop-off route to a bag room. Otherwise, at 810, one or more potential optimal routes for the tail-to-tail task are generated. Generating potential optimal routes may involve several items of information, including constraints 812, input data 814, output from the bags offload time process 400 and the transit time model 602 (both referred to above in connection with FIG. 6) subject to one or more objectives 816.

The constraints 812 may include a maximum route length to be taken, capacities of the tugs available, number of drivers available and departing flight connection time. The input data 814 may include the number of bags for the tail-to-tail task, pickup and drop-off gates involved for the task, weather (which impacts tug driver speed) and aircraft types involved in the task. The aforementioned bags offload time process 400 and transit time model 602 may be employed to provide appropriate input related to bags offload time and transit time, according to one or more objectives 816. The objectives 816 may serve as an additional criterion/criteria, such as to minimize missed bags, minimize the number of drivers utilized and use shorter route lengths. Thus, generating the potential optimal routes at 810 is based on the constraints 812, the input data 814, invocation of the bags offload time process 400 and transit time model 602 subject to the objectives 816. During a given time of day, it may be appropriate to loosen the restrictions on some of the objectives, such as the number of drivers utilized, if there are plenty of drivers available during that time of day. The degree to which the objectives are strictly followed may, therefore, be flexible depending on the state of the system at a given point in time.

At 820, the routes output at 810 is/are evaluated against the objectives 816 to determine whether the solution convergence criteria is achieved. If the convergence criteria is achieved, then at 830, the one or more routes are output. On the other hand, if the convergence criteria is not achieved, then the process reverts back to 810 to repeat the optimal route generation.

Figure 9A:
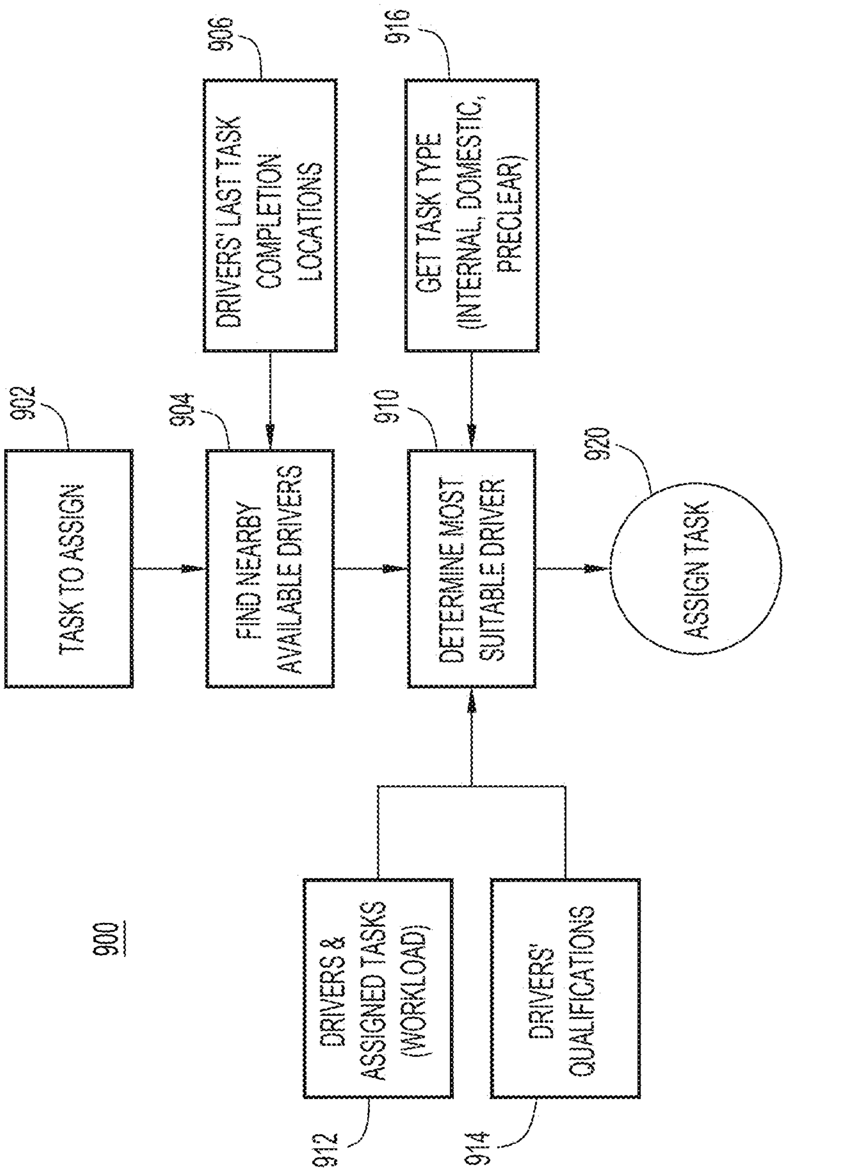
FIGS. 9A and 9B illustrate flow charts for logic to select the most appropriate tug driver to assign a task, according to an example embodiment.
Figure 9B:
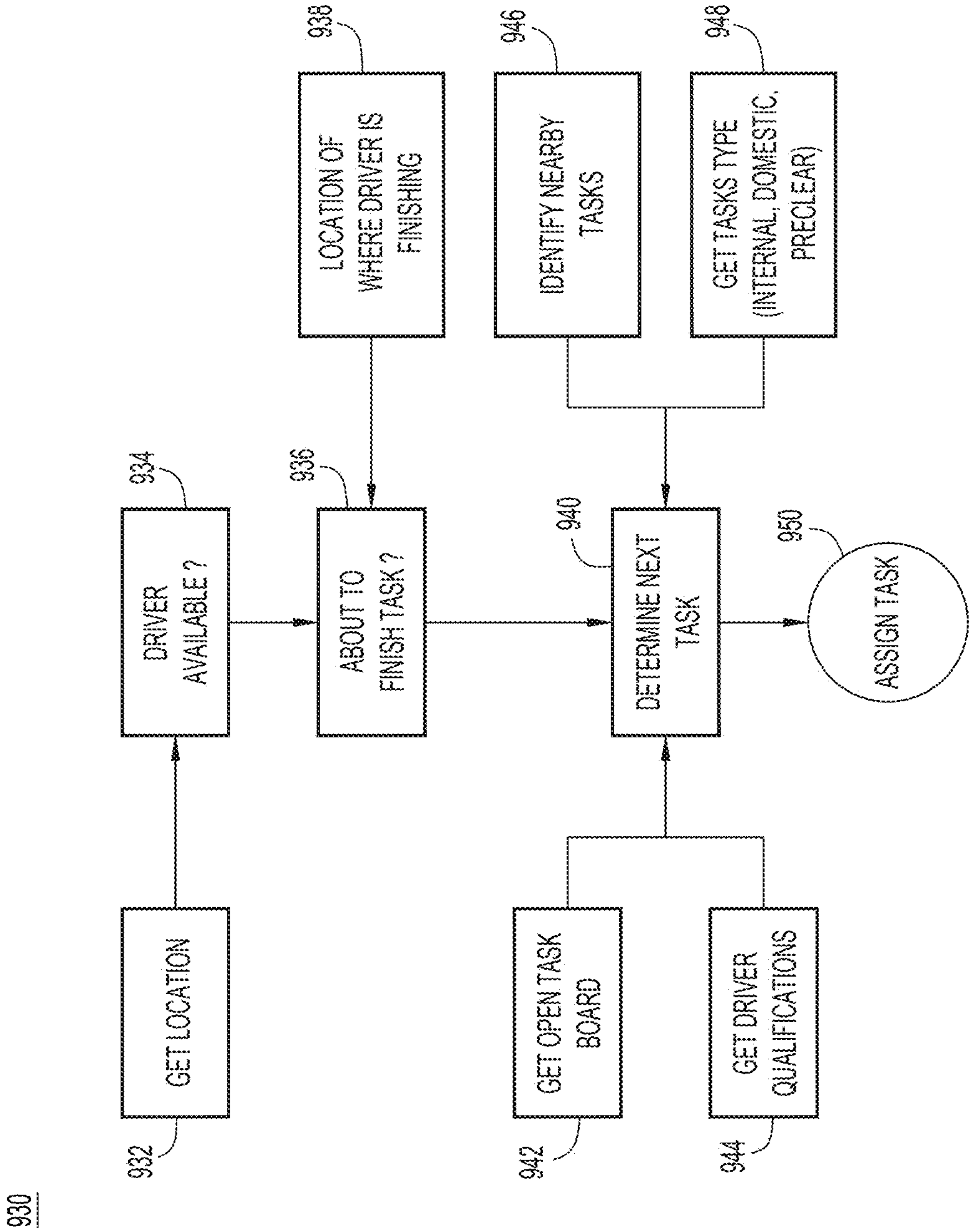

Reference is now made to FIGS. 9A and 9B, which illustrate flow charts for nearby task assignment processes. These processes are invoked at nearby assignment 350 shown in the flow chart of FIG. 3. FIG. 9A illustrates a flow chart for a process 900 to select the most appropriate tug driver to assign a task. The process 900 achieves reducing empty driving legs/segments by assigning next runs to drivers that are in close proximity to completion of a previous run. At 902, a task to assign is obtained, such as a local bag run cold/baggage room run or tail-to-tail run. At 904, a determination of nearby available tug drivers is made based on the last task completion locations of drivers, at 906. Thus, the output of 904 is a plurality of nearby available drivers (based on the location of their completed last task).

At 910, a determination/selection is made of a particular tug driver (e.g., the most suitable driver) among the plurality of nearby available drivers. There are several inputs to operation 910, including the drivers and their assigned tasks (workload) at 912, the qualifications of the drivers at 914, and the task type at 916. The task type may be international flight, domestic flight, pre-clear bag, etc. Thus, operation 910 involves determining the most suitable driver (among the plurality of nearby available drivers) for the task, and this driver is then assigned the task at 920.

FIG. 9B illustrates a flow chart for a process 930 that is invoked to determine the next task to be assigned to a given tug driver. At 932, the location of a given tug driver is determined. At 934, it is determined whether the driver is available and at 936, it is determined whether the driver is about to finish a task. Input to operation 936 may include, at 938, the location of where the driver is finishing the task he/she is about to finish. At 940, the next task for the driver is determined, and there are several inputs to 940. The inputs to 940 include tasks on an open task board 942, which involves those tasks that have arisen that have not yet been assigned to a driver, driver qualifications 944, identified nearby tasks 946 and the types of the tasks (international, domestic, preclear, etc.) 948. Based on these inputs, operation 940 determines the next task for the driver and that task is assigned to the driver at 950.

Figure 10:
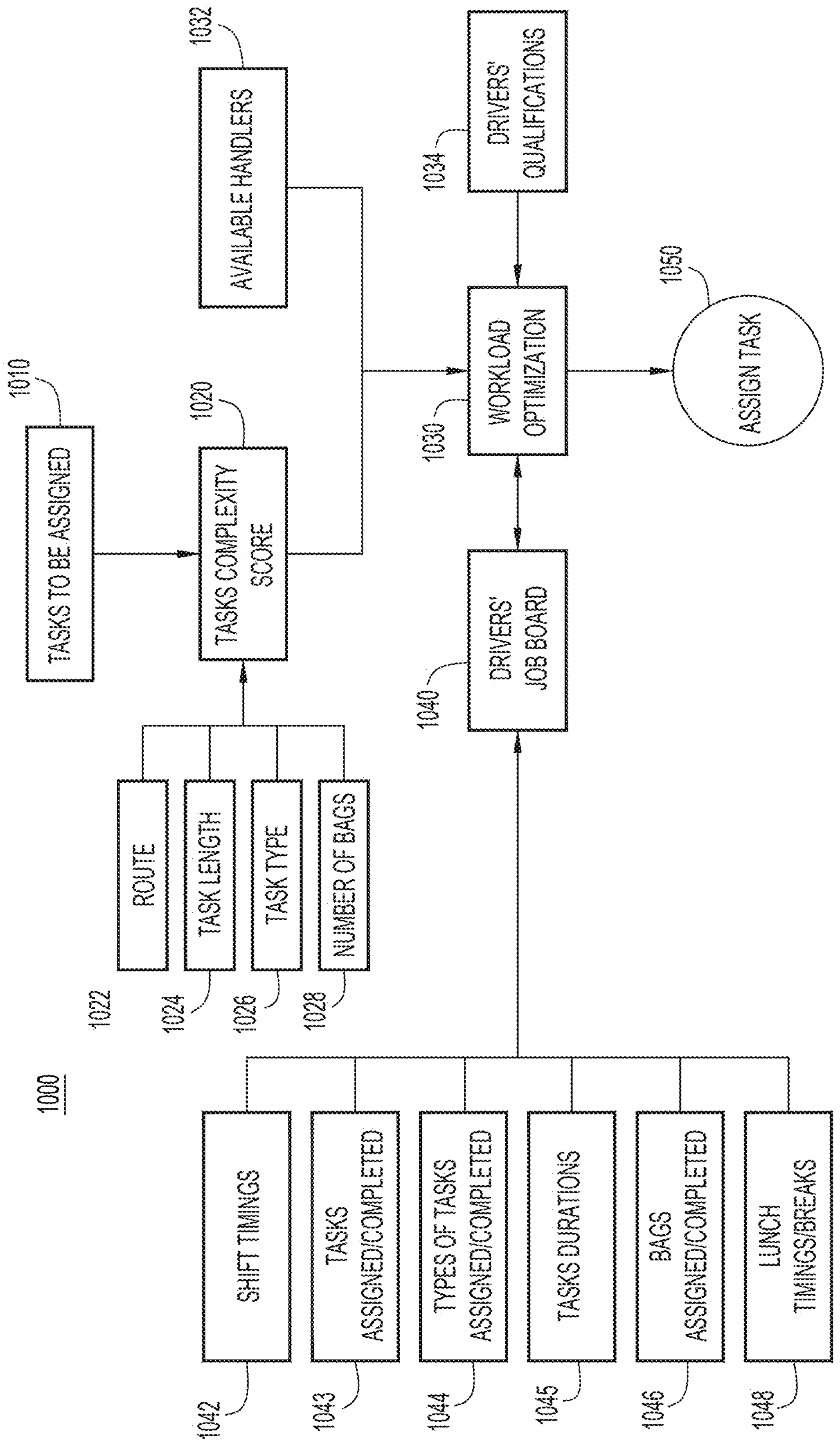
FIG. 10 illustrates a flow chart for a workload optimization process for balancing workload across baggage tug drivers, according to an example embodiment.

Reference is now made to FIG. 10, which illustrates a flow chart for a workload optimization process 1000. The workload optimization process 1000 is executed at 360 in the flow chart of FIG. 3. The workload optimization process 1000 involves assigning tasks across tug drivers/baggage handlers so as to distribute the workload in an optimized manner. Tasks to be assigned are received as input at step 1010. At 1020, a complexity score is computed for each task to be assigned based on the route associated with the task 1022, the length of the task 1024, the type of task 1026 and the number of bags associated with the task 1028. Certain types of tasks may be more burdensome to a tug driver than others. For example, a task in which a tug driver is to take 40 bags to a bag room where the driver needs to unload each of those bags, one after another, for induction in the bag room, will involve more physical exertion than taking each of 5 bags to 5 different gate locations. The task complexity score for the former task will be higher than the task complexity for the latter task.

A workload optimization computation 1030 is then performed based on the complexity scores of the tasks computed at 1020, the available handlers 1032, drivers' qualifications 1034 and drivers' job board 1040. The drivers' job board 1040 is based on several items of information including shift timings 1042, tasks assigned/completed 1043, types of tasks assigned/completed 1044, tasks durations 1045, bags assigned/completed 1046 and lunch/breaks timing 1048. Based on all of this information, the workload optimization computation 1030 determines to whom (which driver of a plurality of available drivers) the tasks that are received at step 1010 are assigned. The outputs of the workload optimization computation 1030 are task assignments at 1050 such that no given driver is overloaded with one type of more difficult task. The degree of physical exertion for various tasks should be distributed across suitable drivers as much as possible across drivers and their shifts. This is the goal of the workload optimization 1030 computation when assigning tasks to drivers.

Figure 11:
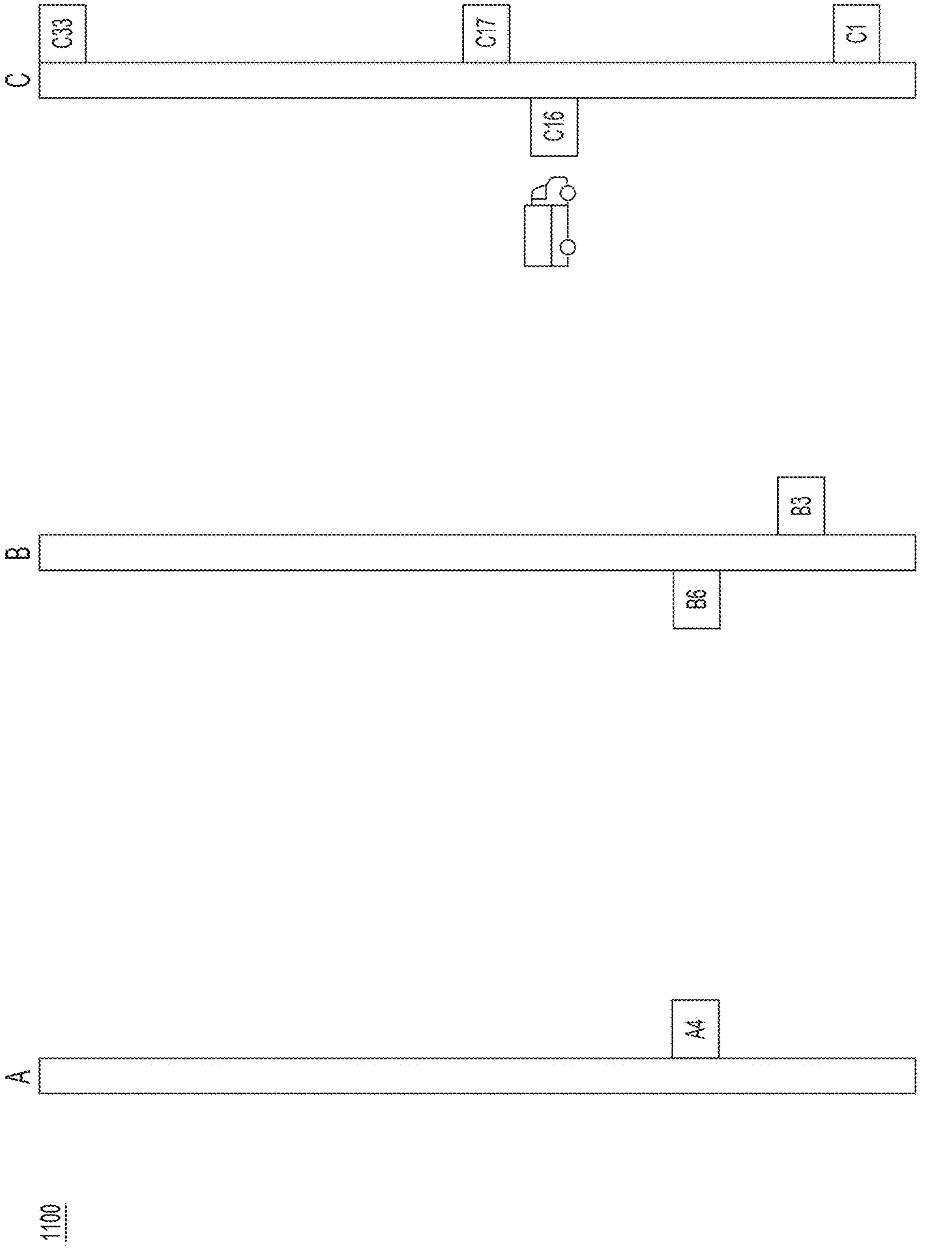
FIG. 11 illustrates an example of an airport gate layout that includes a plurality of concourses and for which improvements can be achieved according to the techniques presented herein.

Reference is now made to FIG. 11. FIG. 11 shows an airport gate layout 1100 that includes a plurality of concourses labeled A, B, and C, each of which has a plurality of gates, only some of which are shown. Using the techniques presented herein, a run time for the following route could be optimized to save 3 minutes from start to finish:

| | |
|---|---|
| Tail Dropoff at C1 | 3 Bags |
| Tail Dropoff at C17 | 1 Bag |
| Tail Dropoff at C33 | 7 Bags |
| Tail Dropoff at B3 | 3 Bags |
| Tail Dropoff at B6 | 3 Bags |
| Tail Dropoff at A4 | 2 Bags |
| Pickup at C16 | 19 Bags |

Figure 12:
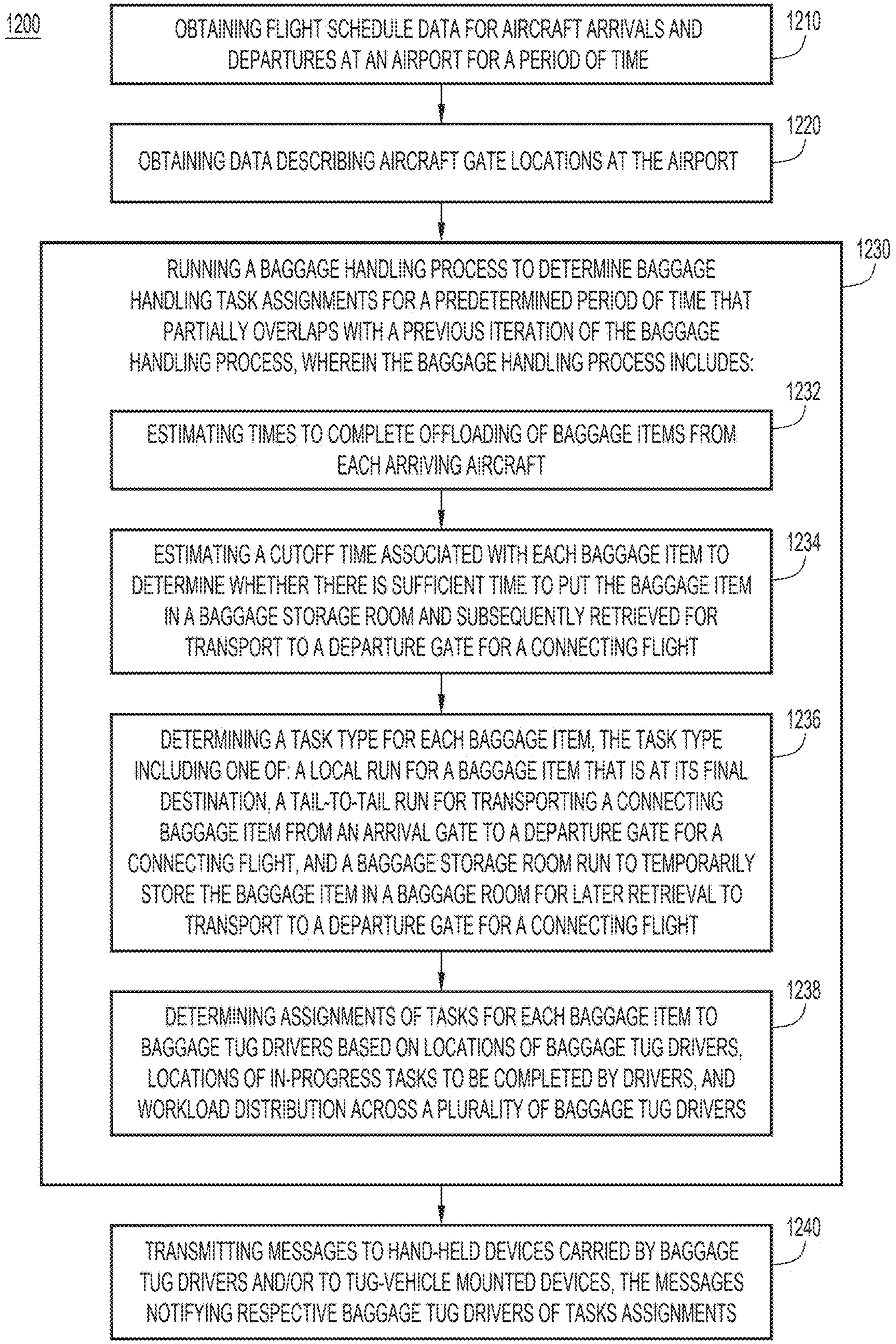
FIG. 12 is a flow chart depicting a computer-implemented method for controlling handling of baggage for aircraft arrivals and departures at an airport, according to an example embodiment.

Turning now to FIG. 12, a flow chart is provided depicting a computer-implemented method 1200 for controlling handling of baggage for aircraft arrivals and departures at an airport. At 1210, the method 1200 involves obtaining flight schedule data for aircraft arrivals and departures at an airport for a period of time. At 1220, the method includes obtaining data describing aircraft gate locations at the airport. On a periodic basis, the method 1200 includes, at 1230, running a baggage handling process to determine baggage handling task assignments for a predetermined period of time that partially overlaps with a previous iteration of the baggage handling process. The baggage handling process includes, at 1232, estimating times to complete offloading of baggage items from each arriving aircraft; at 1234, estimating a cutoff time associated with each baggage item to determine whether there is sufficient time to put the baggage item in a baggage storage room and subsequently retrieve it for transport to a departure gate for a connecting flight; at 1236, determining a task type for each baggage item, the task type including one of: a local run for a baggage item that is at its final destination, a tail-to-tail run for transporting a connecting baggage item from an arrival gate to a departure gate for a connecting flight, and a baggage storage room run to temporarily store the baggage item in a baggage room for later retrieval to transport to a departure gate for a connecting flight; and at 1238, determining assignments of tasks for each baggage item to baggage tug drivers based on locations of baggage tug drivers, locations of in-progress tasks to be completed by drivers, and workload distribution across a plurality of baggage tug drivers. At 1240, the method 1200 includes transmitting messages to hand-held devices carried by baggage tug drivers and/or to tug-vehicle mounted devices, the messages notifying respective baggage tug drivers of task assignments. Note that step 1240 is not necessarily performed at each update cycle of step 1230 because it can be disruptive to constantly send to tug drivers messages that do not achieve significant efficiency improvements over previously sent instructions/assignments. Rather, the method 1200 may involve sending messages to tug drivers only as needed in order to notify them of upcoming assignments when they are completed or near completion of in-progress assignments.

Figure 13:
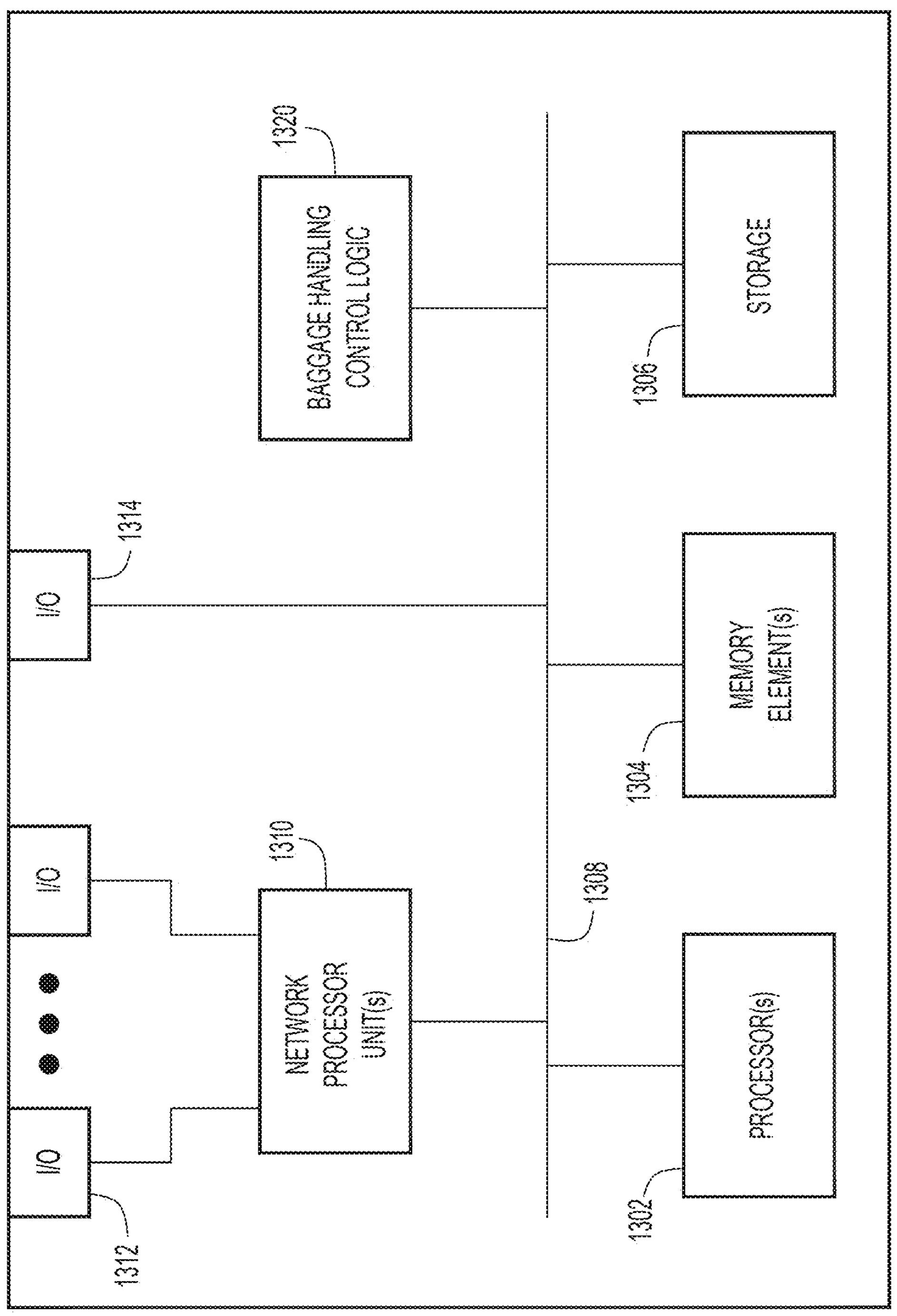
FIG. 13 illustrates a hardware block diagram of a computing device that may perform functions associated with operations discussed herein in connection with the techniques depicted in FIGS. 1-12.

Referring to FIG. 13, FIG. 13 illustrates a hardware block diagram of a computing device 1300 that may perform functions associated with operations discussed herein in connection with the techniques depicted in FIGS. 1-12. In various embodiments, a computing device or apparatus, such as computing device 1300 or any combination of computing devices 1300, may be configured as any entity/entities as discussed for the techniques depicted in connection with operations illustrated/discussed for various embodiments herein.

In at least one embodiment, the computing device 1300 may be any apparatus that may include one or more processor(s) 1302, one or more memory element(s) 1304, data storage 1306, a bus 1308, one or more network processor unit(s) 1310 interconnected with one or more network input/output (I/O) interface(s) 1312, one or more I/O interface(s) 1314, and baggage handling control logic ("control logic") 1320. In various embodiments, instructions associated with logic for computing device 1300 can overlap in any manner and are not limited to the specific allocation of instructions and/or operations described herein.

In at least one embodiment, processor(s) 1302 is/are at least one hardware processor configured to execute various tasks, operations and/or functions for computing device 1300 as described herein according to software and/or instructions configured for computing device 1300. Processor(s) 1302 (e.g., a hardware processor) can execute any type of instructions associated with data to achieve the operations detailed herein. In one example, processor(s) 1302 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 1304 and/or storage 1306 is/are configured to store data, information, software, and/or instructions associated with computing device 1300, and/or logic configured for memory element(s) 1304 and/or storage 1306. For example, any logic described herein (e.g., control logic 1320) can, in various embodiments, be stored for computing device 1300 using any combination of memory element(s) 1304 and/or storage 1306. Note that in some embodiments, storage 1306 can be consolidated with memory element(s) 1304 (or vice versa) or can overlap/exist in any other suitable manner.

In at least one embodiment, bus 1308 can be configured as an interface that enables one or more elements of computing device 1300 to communicate in order to exchange information and/or data. Bus 1308 can be implemented with any architecture designed for passing control, data and/or information between processors, memory elements/storage, peripheral devices, and/or any other hardware and/or software components that may be configured for computing device 1300. In at least one embodiment, bus 1308 may be implemented as a fast kernel-hosted interconnect, potentially using shared memory between processes (e.g., logic), which can enable efficient communication paths between the processes.

In various embodiments, network processor unit(s) 1310 may enable communication between computing device 1300 and other systems, entities, etc., via network I/O interface(s) 1312 (wired and/or wireless) to facilitate operations discussed for various embodiments described herein. In various embodiments, network processor unit(s) 1310 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 1300 and other systems, entities, etc. to facilitate operations for various embodiments described herein. In various embodiments, network I/O interface(s) 1312 can be configured as one or more Ethernet port(s), Fibre Channel ports, any other I/O port(s), and/or antenna(s)/antenna array(s) now known or hereafter developed. Thus, the network processor unit(s) 1310 and/or network I/O interface(s) 1312 may include suitable interfaces for receiving, transmitting, and/or otherwise communicating data and/or information (wired and/or wirelessly) in a network environment.

I/O interface(s) 1314 allow for input and output of data and/or information with other entities that may be connected to computing device 1300. For example, I/O interface(s) 1314 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 1320 can include instructions that, when executed, cause processor(s) 1302 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1320) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 1304 and/or storage 1306 can store data, software, code, instructions (e.g., processor instructions), logic, parameters, combinations thereof, and/or the like used for operations described herein. This includes memory element(s) 1304 and/or storage 1306 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In some aspects, the techniques described herein relate to a computer-implemented method for controlling handling of baggage for aircraft arrivals and departures at an airport, including: obtaining flight schedule data for aircraft arrivals and departures at an airport for a period of time; obtaining data describing aircraft gate locations at the airport; on a periodic basis, running a baggage handling process to determine baggage handling task assignments for a predetermined period of time that partially overlaps with a previous iteration of the baggage handling process, wherein the baggage handling process includes: estimating times to complete offloading of baggage items from each arriving aircraft; estimating a cutoff time associated with each baggage item to determine whether there is sufficient time to put the baggage item in a baggage storage room and subsequently retrieve it for transport to a departure gate for a connecting flight; determining a task type for each baggage item, the task type including one of: a local run for a baggage item that is at its final destination, a tail-to-tail run for transporting a connecting baggage item from an arrival gate to a departure gate for a connecting flight, and a baggage storage room run to temporarily store the baggage item in a baggage room for later retrieval to transport to a departure gate for a connecting flight; and determining assignments of tasks for each baggage item to baggage tug drivers based on locations of baggage tug drivers, locations of in-progress tasks to be completed by drivers, and workload distribution across a plurality of baggage tug drivers; and transmitting messages to hand-held devices carried by baggage tug drivers and/or to tug vehicle mounted devices, the messages notifying respective baggage tug drivers of task assignments.

In some aspects, the techniques described herein relate to a computer-implemented method, wherein estimating times to complete offloading of baggage is based on a machine-learning model trained by running simulations using historical data related to offloading bags from aircraft for aircraft arrivals and departures at the airport.

In some aspects, the techniques described herein relate to a computer-implemented method, wherein estimating times to complete offloading of baggage is based on type of aircraft, baggage load of the aircraft, passenger load of the aircraft and airport location constraints including gate location and weather.

In some aspects, the techniques described herein relate to a computer-implemented method, wherein estimating a cutoff time associated with each baggage item is based on whether a given baggage item is connecting or local, connection times for connecting flights associated with connecting baggage items on each arrival aircraft, volume of baggage on each arrival aircraft, baggage system operation variables including number of available baggage tug drivers, number of available baggage tugs, airport flight arrival rate, flight arrival time of day, current weather, and distance to nearest baggage storage room.

In some aspects, the techniques described herein relate to a computer-implemented method, wherein the baggage handling process further includes determining for each connecting baggage item, whether there is sufficient time to transport the connecting baggage item to a departure gate based on a connection time for the connecting baggage item, a location of the arrival gate for the connecting baggage item and a location of the departure gate for the connecting baggage item.

In some aspects, the techniques described herein relate to a computer-implemented method, wherein the baggage handling process further includes, when it is determined that there is not sufficient time to transport the connecting baggage item to the departure gate, assigning a non-urgent status to the connecting baggage item for subsequent handling in order for it to reach its final destination.

In some aspects, the techniques described herein relate to a computer-implemented method, wherein the baggage handling process further includes, for a baggage item determined to be temporarily stored in a baggage storage room, determining which baggage storage room of a plurality of baggage storage rooms to temporarily store the baggage item.

In some aspects, the techniques described herein relate to a computer-implemented method, wherein determining which baggage storage room of a plurality of baggage storage rooms to temporarily store the baggage item is based on a number of drivers waiting to induct bags to respective ones of the plurality of baggage storage rooms, estimated wait times to induct bags to respective ones of the plurality of baggage storage rooms, distance from a current location of the baggage item to each of the plurality of baggage storage rooms and time to travel from the current location of the baggage item to respective ones of the plurality of baggage storage rooms.

In some aspects, the techniques described herein relate to a computer-implemented method, wherein determining assignments of tasks for each baggage item to a baggage tug driver includes determining, for each connecting baggage item, one or more routes for transporting the connecting baggage item from its arrival gate to its departure gate.

In some aspects, the techniques described herein relate to a computer-implemented method, wherein determining the one or more routes is based on constraints including maximum route length, baggage tug capacity, number of available tug drivers, departing flight connection times, weather, number of connecting baggage items, locations of arrival gate and departure gate for each connecting baggage item, aircraft type, estimated times to complete offloading of baggage items from each arrival aircraft, and estimated time to travel between an arrival gate and a departure gate for each connecting baggage item.

In some aspects, the techniques described herein relate to a computer-implemented method, wherein determining the one or more routes is further based on objectives to minimize missed baggage items, minimize number of tug drivers used, and select shorter route lengths.

In some aspects, the techniques described herein relate to a computer-implemented method, wherein determining assignments of tasks for each baggage item to baggage tug drivers includes: identifying nearby available baggage tug drivers based on locations of in-progress tasks to be completed; and selecting a particular baggage tug driver from the nearby available baggage tug drivers based on workload of the nearby available baggage tug drivers, driver qualifications of the nearby available baggage tug drivers to enter specific airport areas and type of task.

In some aspects, the techniques described herein relate to a computer-implemented method, wherein determining assignments of tasks is based on a task complexity score that represents a physical burden or duration associated with a task, numbers and types of tasks already assigned and/or already completed by a plurality of baggage tug drivers, and qualifications of respective baggage tug drivers to enter specific airport areas.

In some aspects, the techniques described herein relate to a system for controlling handling of baggage for aircraft arrivals and departures at an airport, including: a plurality of user devices to be carried by baggage tug drivers and mounted to tug vehicles, each of the plurality of user devices configured to present notifications to baggage tug drivers of task assignments; and a computer system configured to perform operations including: obtaining flight schedule data for aircraft arrivals and departures at an airport for a period of time; obtaining data describing aircraft gate locations at the airport; on a periodic basis, running a baggage handling process to determine baggage handling task assignments for a predetermined period of time that partially overlaps with a previous iteration of the baggage handling process, wherein the baggage handling process includes: estimating times to complete offloading of baggage items from each arriving aircraft; estimating a cutoff time associated with each baggage item to determine whether there is sufficient time to put the baggage item in a baggage storage room and subsequently retrieve it for transport to a departure gate for a connecting flight; determining a task type for each baggage item, the task type including one of: a local run for a baggage item that is at its final destination, a tail-to-tail run for transporting a connecting baggage item from an arrival gate to a departure gate for a connecting flight, and a baggage storage room run to temporarily store the baggage item in a baggage room for later retrieval to transport to a departure gate for a connecting flight; and determining assignments of tasks for each baggage item to baggage tug drivers based on locations of baggage tug drivers, locations of in-progress tasks to be completed by drivers, and workload distribution across a plurality of baggage tug drivers; and transmitting messages to the respective ones of the plurality of user devices, the messages notifying respective baggage tug drivers of task assignments.

In some aspects, the techniques described herein relate to a system, wherein the computer system estimates times to complete offloading of baggage based on a machine-learning model trained by running simulations using historical data related to offloading bags from aircraft for aircraft arrivals and departures at the airport.

In some aspects, the techniques described herein relate to a system, wherein the computer system estimates a cutoff time associated with each baggage item based on whether a given baggage item is connecting or local, connection times for connecting flights associated with connecting baggage items on each arrival aircraft, volume of baggage on each arrival aircraft, baggage system operation variables including number of available baggage tug drivers, number of available baggage tugs, airport flight arrival rate, flight arrival time of day, current weather, and distance to a nearest baggage storage room.

In some aspects, the techniques described herein relate to a system, wherein the computer system further performs an operation of determining for each connecting baggage item, whether there is sufficient time to transport the connecting baggage item to a departure gate based on a connection time for the connecting baggage item, a location of the arrival gate for the connecting baggage item and a location of the departure gate for the connecting baggage item.

In some aspects, the techniques described herein relate to a system, wherein when the computer system determines that there is not sufficient time to transport the connecting baggage item to the departure gate, the computer system further performs an operation of assigning a non-urgent status to the connecting baggage item for subsequent handling in order for it to reach its final destination.

In some aspects, the techniques described herein relate to one or more non-transitory computer readable storage media encoded with instructions that, when executed by a computer, cause the computer to perform operations including: obtaining flight schedule data for aircraft arrivals and departures at an airport for a period of time; obtaining data describing aircraft gate locations at the airport; on a periodic basis, running a baggage handling process to determine baggage handling task assignments for a predetermined period of time that partially overlaps with a previous iteration of the baggage handling process, wherein the baggage handling process includes: estimating times to complete offloading of baggage items from each arriving aircraft; estimating a cutoff time associated with each baggage item to determine whether there is sufficient time to put the baggage item in a baggage storage room and subsequently retrieve it for transport to a departure gate for a connecting flight; determining a task type for each baggage item, the task type including one of: a local run for a baggage item that is at its final destination, a tail-to-tail run for transporting a connecting baggage item from an arrival gate to a departure gate for a connecting flight, and a baggage storage room run to temporarily store the baggage item in a baggage room for later retrieval to transport to a departure gate for a connecting flight; and determining assignments of tasks for each baggage item to baggage tug drivers based on locations of baggage tug drivers, locations of in-progress tasks to be completed by drivers, and workload distribution across a plurality of baggage tug drivers; and transmitting messages to hand-held devices carried by baggage tug drivers and/or to tug vehicle mounted devices, the messages notifying respective baggage tug drivers of task assignments.

In some aspects, the techniques described herein relate to one or more non-transitory computer readable storage media, wherein the baggage handling process further includes determining for each connecting baggage item, whether there is sufficient time to transport the connecting baggage item to a departure gate based on a connection time for the connecting baggage item, a location of the arrival gate for the connecting baggage item and a location of the departure gate for the connecting baggage item; and when it is determined there is not sufficient time to transport the connecting baggage item to the departure gate, assigning a non-urgent status to the connecting baggage item for subsequent handling in order for it to reach its final destination.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may be directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combinations of the associated listed items.

For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the' (s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained by one skilled in the art and it is intended that the present disclosure encompass all such changes, substitutions, variations, alterations, and/or modifications as falling within the scope of the appended claims.

What is claimed is:

1. A computer-implemented method for controlling handling of baggage for aircraft arrivals and departures at an airport, comprising:

- obtaining flight schedule data for aircraft arrivals and departures at an airport for a period of time;
- obtaining data describing aircraft gate locations at the airport;
- on a periodic basis, running a baggage handling process to determine baggage handling task assignments for a predetermined period of time that partially overlaps with a previous iteration of the baggage handling process, wherein the baggage handling process includes:
  - estimating times to complete offloading of baggage items from each arriving aircraft;
  - estimating a cutoff time associated with each baggage item to determine whether there is sufficient time to put the baggage item in a baggage storage room and subsequently retrieve it for transport to a departure gate for a connecting flight;
  - determining a task type for each baggage item, the task type including one of: a local run for a baggage item that is at its final destination, a tail-to-tail run for transporting a connecting baggage item from an arrival gate to a departure gate for a connecting flight, and a baggage storage room run to temporarily store the baggage item in a baggage room for later retrieval to transport to a departure gate for a connecting flight; and
  - determining assignments of tasks for each baggage item to baggage tug drivers based on locations of baggage tug drivers, locations of in-progress tasks to be completed by drivers, and workload distribution across a plurality of baggage tug drivers; and
- transmitting messages to hand-held devices carried by baggage tug drivers and/or to tug vehicle mounted devices, the messages notifying respective baggage tug drivers of task assignments.

2. The computer-implemented method of claim 1, wherein estimating times to complete offloading of baggage is based on a machine-learning model trained by running simulations using historical data related to offloading bags from aircraft for aircraft arrivals and departures at the airport.

3. The computer-implemented method of claim 2, wherein estimating times to complete offloading of baggage is based on type of aircraft, baggage load of the aircraft, passenger load of the aircraft and airport location constraints including gate location and weather.

4. The computer-implemented method of claim 1, wherein estimating a cutoff time associated with each baggage item is based on whether a given baggage item is connecting or local, connection times for connecting flights associated with connecting baggage items on each arrival aircraft, volume of baggage on each arrival aircraft, baggage system operation variables including number of available baggage tug drivers, number of available baggage tugs, airport flight arrival rate, flight arrival time of day, current weather, and distance to nearest baggage storage room.

5. The computer-implemented method of claim 1, wherein the baggage handling process further includes determining for each connecting baggage item, whether there is sufficient time to transport the connecting baggage item to a departure gate based on a connection time for the connecting baggage item, a location of the arrival gate for the connecting baggage item and a location of the departure gate for the connecting baggage item.

6. The computer-implemented method of claim 5, wherein the baggage handling process further includes, when it is determined that there is not sufficient time to transport the connecting baggage item to the departure gate, assigning a non-urgent status to the connecting baggage item for subsequent handling in order for it to reach its final destination.

7. The computer-implemented method of claim 1, wherein the baggage handling process further includes, for a baggage item determined to be temporarily stored in a baggage storage room, determining which baggage storage room of a plurality of baggage storage rooms to temporarily store the baggage item.

8. The computer-implemented method of claim 7, wherein determining which baggage storage room of a plurality of baggage storage rooms to temporarily store the baggage item is based on a number of drivers waiting to induct bags to respective ones of the plurality of baggage storage rooms, estimated wait times to induct bags to respective ones of the plurality of baggage storage rooms, distance from a current location of the baggage item to each of the plurality of baggage storage rooms and time to travel from the current location of the baggage item to respective ones of the plurality of baggage storage rooms.

9. The computer-implemented method of claim 1, wherein determining assignments of tasks for each baggage item to a baggage tug driver includes determining, for each connecting baggage item, one or more routes for transporting the connecting baggage item from its arrival gate to its departure gate.

10. The computer-implemented method of claim 9, wherein determining the one or more routes is based on constraints including maximum route length, baggage tug capacity, number of available tug drivers, departing flight connection times, weather, number of connecting baggage items, locations of arrival gate and departure gate for each connecting baggage item, aircraft type, estimated times to complete offloading of baggage items from each arrival aircraft, and estimated time to travel between an arrival gate and a departure gate for each connecting baggage item.

11. The computer-implemented method of claim 10, wherein determining the one or more routes is further based on objectives to minimize missed baggage items, minimize number of tug drivers used, and select shorter route lengths.

12. The computer-implemented method of claim 1, wherein determining assignments of tasks for each baggage item to baggage tug drivers comprises:

identifying nearby available baggage tug drivers based on locations of in-progress tasks to be completed; and selecting a particular baggage tug driver from the nearby available baggage tug drivers based on workload of the nearby available baggage tug drivers, driver qualifications of the nearby available baggage tug drivers to enter specific airport areas and type of task.

13. The computer-implemented method of claim 1, wherein determining assignments of tasks is based on a task complexity score that represents a physical burden or duration associated with a task, numbers and types of tasks already assigned and/or already completed by a plurality of baggage tug drivers, and qualifications of respective baggage tug drivers to enter specific airport areas.

14. A system for controlling handling of baggage for aircraft arrivals and departures at an airport, comprising:

a plurality of user devices to be carried by baggage tug drivers and mounted to tug vehicles, each of the plurality of user devices configured to present notifications to baggage tug drivers of task assignments; and a computer system configured to perform operations including:

obtaining flight schedule data for aircraft arrivals and departures at an airport for a period of time;

obtaining data describing aircraft gate locations at the airport;

on a periodic basis, running a baggage handling process to determine baggage handling task assignments for a predetermined period of time that partially overlaps with a previous iteration of the baggage handling process, wherein the baggage handling process includes:

estimating times to complete offloading of baggage items from each arriving aircraft;

estimating a cutoff time associated with each baggage item to determine whether there is sufficient time to put the baggage item in a baggage storage room and subsequently retrieve it for transport to a departure gate for a connecting flight;

determining a task type for each baggage item, the task type including one of: a local run for a baggage item that is at its final destination, a tail-to-tail run for transporting a connecting baggage item from an arrival gate to a departure gate for a connecting flight, and a baggage storage room run to temporarily store the baggage item in a baggage room for later retrieval to transport to a departure gate for a connecting flight; and determining assignments of tasks for each baggage item to baggage tug drivers based on locations of baggage tug drivers, locations of in-progress tasks to be completed by drivers, and workload distribution across a plurality of baggage tug drivers; and transmitting messages to respective ones of the plurality of user devices, the messages notifying respective baggage tug drivers of task assignments.

15. The system of claim 14, wherein the computer system estimates times to complete offloading of baggage based on a machine-learning model trained by running simulations using historical data related to offloading bags from aircraft for aircraft arrivals and departures at the airport.

16. The system of claim 15, wherein the computer system estimates a cutoff time associated with each baggage item based on whether a given baggage item is connecting or local, connection times for connecting flights associated with connecting baggage items on each arrival aircraft, volume of baggage on each arrival aircraft, baggage system operation variables including number of available baggage tug drivers, number of available baggage tugs, airport flight arrival rate, flight arrival time of day, current weather, and distance to nearest baggage storage room.

17. The system of claim 14, wherein the computer system further performs an operation of determining for each connecting baggage item, whether there is sufficient time to transport the connecting baggage item to a departure gate based on a connection time for the connecting baggage item, a location of the arrival gate for the connecting baggage item and a location of the departure gate for the connecting baggage item.

18. The system of claim 17, wherein when the computer system determines that there is not sufficient time to transport the connecting baggage item to the departure gate, the computer system further performs an operation of assigning a non-urgent status to the connecting baggage item for subsequent handling in order for it to reach its final destination.

19. One or more non-transitory computer readable storage media encoded with instructions that, when executed by a computer, cause the computer to perform operations including:

obtaining flight schedule data for aircraft arrivals and departures at an airport for a period of time;

obtaining data describing aircraft gate locations at the airport;

on a periodic basis, running a baggage handling process to determine baggage handling task assignments for a predetermined period of time that partially overlaps with a previous iteration of the baggage handling process, wherein the baggage handling process includes:

estimating times to complete offloading of baggage items from each arriving aircraft;

estimating a cutoff time associated with each baggage item to determine whether there is sufficient time to put the baggage item in a baggage storage room and subsequently retrieve it for transport to a departure gate for a connecting flight;

determining a task type for each baggage item, the task type including one of: a local run for a baggage item that is at its final destination, a tail-to-tail run for transporting a connecting baggage item from an arrival gate to a departure gate for a connecting flight, and a baggage storage room run to temporarily store the baggage item in a baggage room for later retrieval to transport to a departure gate for a connecting flight; and determining assignments of tasks for each baggage item to baggage tug drivers based on locations of baggage tug drivers, locations of in-progress tasks to be completed by drivers, and workload distribution across a plurality of baggage tug drivers; and transmitting messages to hand-held devices carried by baggage tug drivers and/or to tug vehicle mounted devices, the messages notifying respective baggage tug drivers of task assignments.

20. The one or more non-transitory computer readable storage media of claim 19, wherein the baggage handling process further includes determining for each connecting baggage item, whether there is sufficient time to transport the connecting baggage item to a departure gate based on a connection time for the connecting baggage item, a location of the arrival gate for the connecting baggage item and a location of the departure gate for the connecting baggage item; and when it is determined there is not sufficient time to transport the connecting baggage item to the departure gate, assigning a non-urgent status to the connecting baggage item for subsequent handling in order for it to reach its final destination.

* * * * *